United States Patent [19]
Fallacaro et al.

[11] Patent Number: 4,771,344
[45] Date of Patent: Sep. 13, 1988

[54] SYSTEM FOR ENHANCING AUDIO AND/OR VISUAL PRESENTATION

[76] Inventors: James Fallacaro, Rte. 7, No. 88A, Kent, Conn. 06757; Joe Truchsess, 11 Windward La. TH12, City Island, N.Y. 10464

[21] Appl. No.: 930,227

[22] Filed: Nov. 13, 1986

[51] Int. Cl.⁴ .............................................. H04N 5/76
[52] U.S. Cl. ..................................... 358/335; 358/83; 358/93; 360/55; 360/137
[58] Field of Search ........................ 358/335, 3, 83, 93, 358/88, 87; 360/55, 137, 19.1; 52/664

[56] References Cited
U.S. PATENT DOCUMENTS 3,291,904 12/1966 Ratliff, Jr. ........................ 358/83 X
4,538,494 9/1985 Farnum ............................... 52/664

Primary Examiner—Robert L. Richardson

[57] ABSTRACT

A system for enhancing the perception of an audio and/or visual presentation by stimulating one or more persons experiencing the audio and/or visual presentation in response to events occurring during the presentation, the stimulation occurring in real time correspondence with the occurrence of the events in the presentation as experienced by the participants for stimulating the participants as the events occur in the presentation.

81 Claims, 9 Drawing Sheets

SYSTEM FOR ENHANCING AUDIO AND/OR VISUAL PRESENTATION

BACKGROUND OF THE INVENTION

1. Field of the Invention

This invention pertains to stimulation of a viewer in response to an audio or visual event, and more particularly to stimulation of a viewer in real time correspondence with one or more events occurring during said audio and/or video presentation.

2. Background Art

The entertainment industry is a major industry in the United States. Sports presentations, concerts, etc. are viewed live by millions of people each year. Additional millions of people view recordings of these events. In the case of musical presentations such as concerts, the recording may comprise an audio cassette, a record album or, more recently, a compact disc. In the case of audiovisual presentations, such as boxing matches, the recording is typically a videocassette.

While it is certainly entertaining to view a live presentation of a concert, sporting event or other entertainment presentation, the viewing of such events would be further enhanced if the viewer's observation involved more than simply hearing and/or seeing the presentation, whether live or in the form of a recording.

Another popular form of audiovisual presentation is the "video game". With the advent of low cost home computers, video games have found their way into homes everywhere. In a typical video game, the user views a video display and hears associated sound, and interacts with the display via a "joystick" or other controller. While such games are entertaining, here too the viewing experience could be further enhanced if the viewer were stimulated by more than the usual audiovisual presentation of the game as displayed on a television or other monitor.

It is accordingly an object of the present invention to provide a system for enhancing a viewer's observation of a presentation such as a sports event, concert, video game etc.

It is still a further object of the present invention to provide a system for enhancing the viewer's observation of the presentation, whether the presentation viewed is live or recorded.

It is still a further object of the present invention to provide a system for enhancing the viewer's observation of an audio and/or video presentation, whether such audio and/or video presentation is live or recorded.

It is a further object of the present invention to enhance a viewer's observation of a presentation by involving senses other than sight and hearing.

It is still a further object of the present invention to enhance a viewer's observation of a presentation by tactilely stimulating the viewer in response to specific events occurring during the presentation.

It is still a further object of the present invention to provide a system wherein the presentation may be viewed by a plurality of viewers, and wherein all of the viewers may be simultaneously tactilely stimulated in response to specific events occurring during the presentation, even when the viewers are at more than one location.

It is a specific object of the present invention to provide a system of the aforementioned type wherein the viewing of a boxing match is enhanced by tactilely stimulating one or more viewers in response to special events in the boxing match.

It is also a specific object of the invention to provide a system wherein music is tactilely enhanced by tactilely stimulating one or more viewers in response to specific events in the music.

DISCLOSURE OF THE INVENTION

Figure 1:
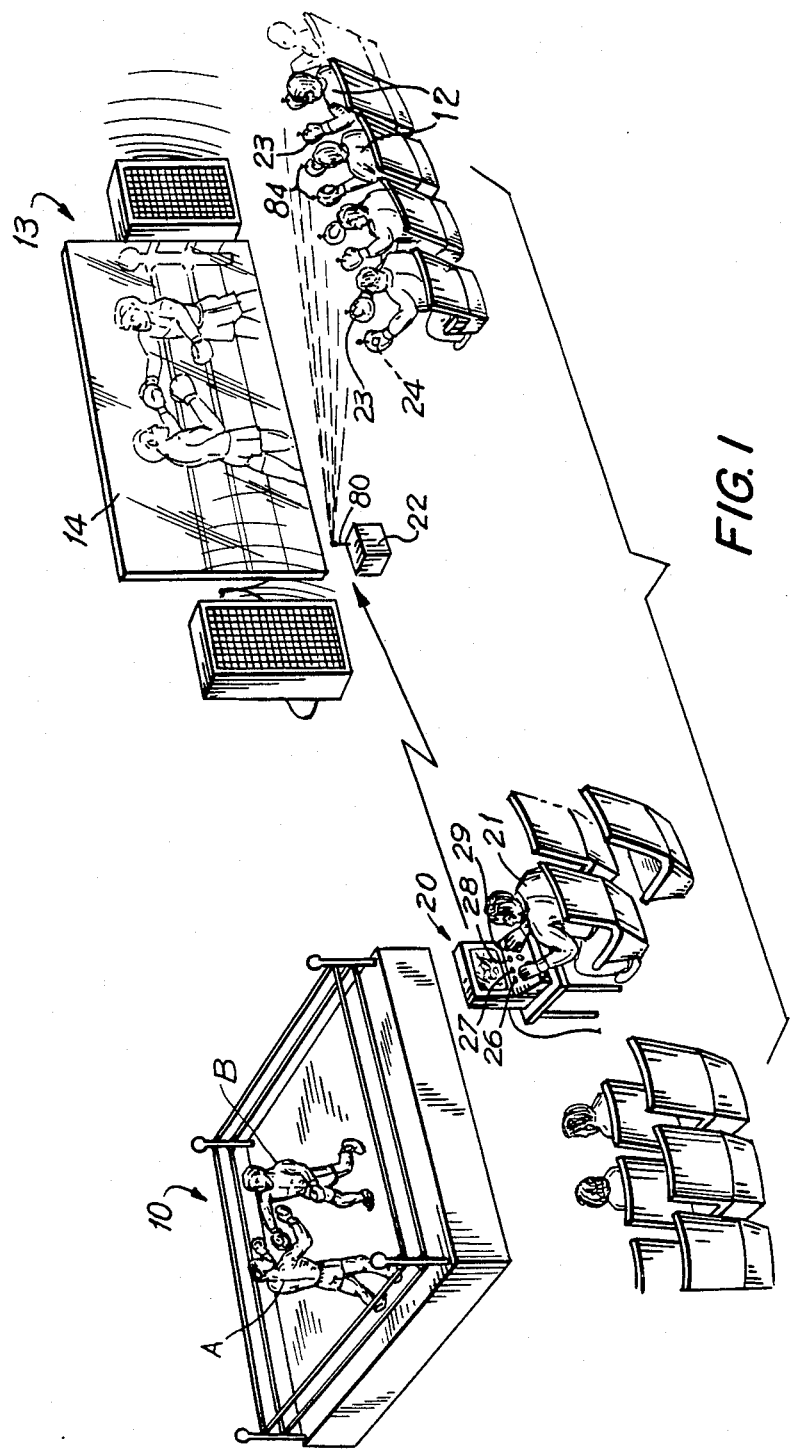
FIG. 1 is a perspective, partially diagrammatic representation of a preferred system in accordance with the present invention.

In accordance with the present invention, we have developed a system for enhancing the perception of an audio and/or visual presentation by stimulating persons experiencing the presentation in response to special events occurring during the presentation. The stimulation may comprise tactile stimulation or, alternatively, audible and/or visual stimulation in addition to that present in the audio and/or visual presentation.

In its broad sense, the system comprises means for generating data representing one or more events occurring during an audio and/or visual presentation, means for encoding the data in a first signal in a form suitable for transmission, means for transmitting the encoded signal in real time correspondence with the audio and/or visual presentation, means for receiving the transmitted encoded signal and for producing a second signal modulated by the data, and means responsive to the second signal and disposed in proximity to the participants for stimulating the participants in response to the events represented by the data, the stimulation of the participants occurring in real time correspondence with the occrrrence of the events in the audio and/or visual presentation as experienced by the participants for stimulating the participants as the events occur in the audio and/or visual presentation.

Also in accordance with the invention, the encoded data can be recorded in a medium along with the audio and/or visual presentation. For example, the medium may comprise a videocassette or cartridge, or an audio cassette, record or compact disc. With particular reference to this aspect of the invention, the present invention also comprises, in a broad sense, a system for enhancing the perception of an audio and/or visual presentation through stimulation of one or more persons experiencing the audio and/or visual presentation, the system comprising a medium in which the audio and/or visual presentation is recorded in a form suitable for playback on a conventional playback device, data encoded in the medium representing one or more events occurring during the audio and/or visual presentation, means for transmitting the data to a location remote from the conventional playback device as the encoded and/or visual presentation is viewed, means remote from the conventional playback device for receiving the transmitted data and for producing a second signal modulated by the data, and means responsive to the second signal and disposed in the vicinity of the participants for stimulating the participants in response to each of the events represented by the data, the stimulation of the participants occurring in real time correspondence with the occurrence of the events in the audio and/or visual presentation as experienced by the participants for stimulating the participants as the events occur in the audio and/or visual presentation.

By way of example, the events may comprise punches thrown and landed by boxers in a boxing match, and the stimulation may comprise a gentle rap applied across the knuckles of the viewers each time a boxer lands a punch. In this embodiment, the viewers have the option of selecting as between the two boxers such that a rap will be applied across the knuckles of the viewers only in response to punches landed by one or the other of the two boxers. In another embodiment, the events comprise specific frequencies occurring during a concert, and the stimulation comprises impacting some portion of the listener's body each time the specific frequencies occur. In a still further embodiment, the events may comprise shots fired by tanks as viewed on a video monitor in accordance with instruction received from a video cartridge, and the stimulation may comprise simulated firing of a three dimensional toy tank situated in proximity to the participants.

These as well as further features and advantages of the present invention will be more fully apparent from the following detailed description and annexed drawings of the presently preferred embodiments thereof.

DETAILED DESCRIPTION OF THE PREFERRED EMBODIMENTS

Referring now to the drawings, and initially to FIG. 1 thereof, the apparatus of the present invention will now be described with reference to tactile enhancement of a sports presentation, and particularly a boxing match, though it will be apparent that the system of the present invention may be utilized to provide tactile enhancement of any presentation having an audible and/or visual content to be experienced by one or more persons.

In FIG. 1, an audiovisual transmission of a boxing match 10 is being observed by one or more viewers 12 at a location 13 remote from the live match. As is common, the boxing match is taking place at a sports arena before a live gate, and is transmitted to several remote locations, such as movie theaters, where others view an audiovisual transmission of the match.

In accordance with the present invention, the viewers 12 observing the boxing match 10 at the remote location 13 experience tactile stimulation corresponding to one or more events in the audio and/or video portions of the transmission being viewed. In the embodiment described herein, the events comprise punches landed by the boxers A and B and the tactile stimulation experienced by the viewers 12 comprises impacting the knuckles of the viewers' hands in synchronization with the punches. However, as this description progresses it will be apparent that the system may be modified such that the viewers 12 experience tactile stimulation corresponding to other events, such as the impact of body punches.

The preferred apparatus in accordance with the present invention for effecting tactile stimulation of the hands of the viewers 12 in synchronization with punches landed by the boxers A and B comprises three major components, namely, a encoder 20 wherein the events in the live boxing match 10 to be enhanced by tactile stimulation are converted to audio-frequency control tones which are then mixed with the usual program audio for transmission therewith to one or more remote locations 13, a decoder/transmitter 22 at each remote location 13 for separating the control tones from the audiovisual broadcast and for retransmitting the control tones to the viewers 12, and a receiver/actuator 24 incorporated in gloves 23 worn by the viewers 12 for receiving the control tones and utilizing them for activating an actuator which tactilely stimulates the hands of the viewers.

Figure 2:
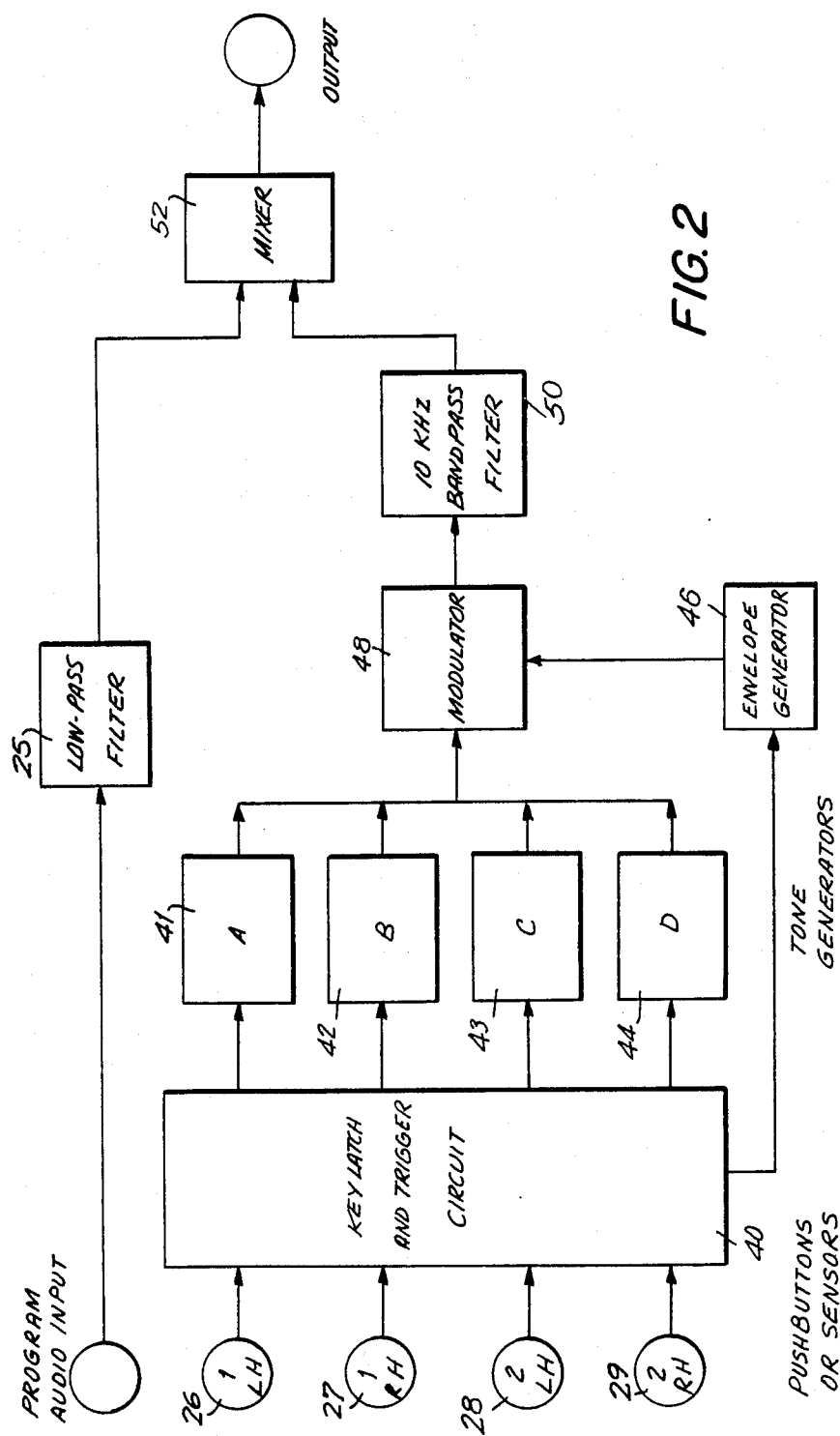
FIG. 2 is a diagrammatic representation of the encoder section of the preferred system in accordance with the present invention.
Figure 3:
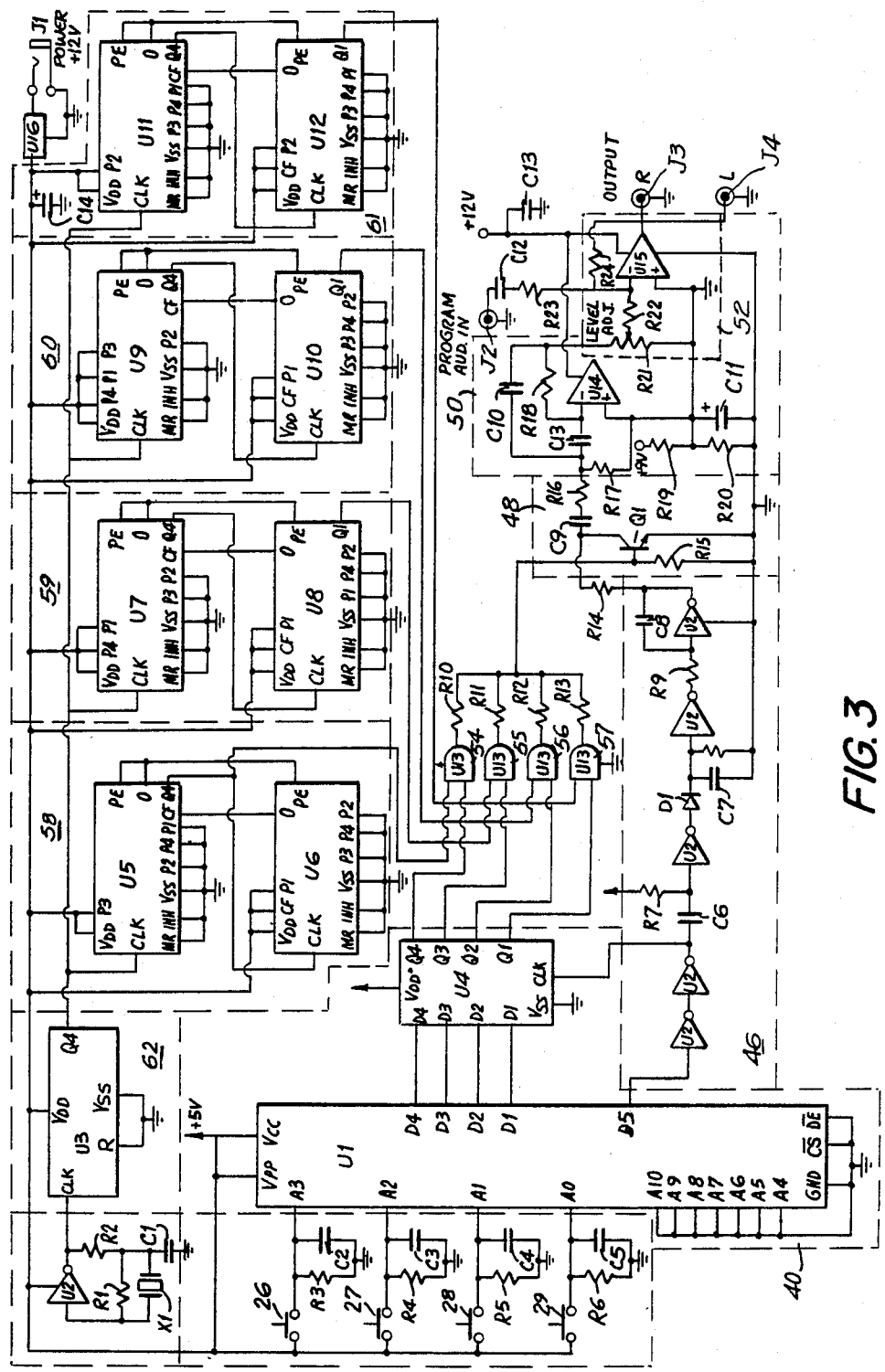
FIG. 3 is a schematic representation of the encoder section of FIG. 2.

Referring now to FIGS. 1-3, the encoder 20 will now be described in greater detail. As usual, the audio and video for each round of the boxing match 10 is recorded by a conventional television camera (not shown). The video output from the camera is transmitted to the remote locations 13 in the usual manner. The audio output from the camera is input to the encoder 20. In the encoder 20, and as shown in FIG. 2, the audio signal is input to a low pass filter 25 having a cut off frequency of, for example, 4 kHz. This clears the high end of the audio frequency range without adversely affecting the quality of the program audio in any significant way, since most, if not all, of the audible portion of the audio frequency spectrum is at or below 4 kHz.

As shown in FIG. 1, an operator 21 at the site of the live match 10 is positioned to operate the encoder 20. The encoder 20, in response to data input by the operator 21, generates a real time signal in the portion of the audio frequency spectrum above 4 kHz, which signal comprises data representative of the events to be enhanced by tactile stimulation of the viewers 12, in this case punches landed by the two boxers. Since each boxer throws punches with both hands, the operator 21 must be capable of generating a signal having at least four distinguishable data components, namely, one component for the left hand of the first boxer, one component for the right hand of the first boxer, one component for the left hand of the second boxer and one component for the right hand of the second boxer. This comprises a relatively simple system, and it will be apparent form this description that the system may be expanded to incorporate more than four distinguishable data components. For example, additional events susceptible to enhancement by tactile stimulation, may comprise punches received by the boxers, in which case additional data components representative of this additional information would be incorporated in the signal generated by the encoder 20.

In the embodiment shown in FIGS. 1-3, the operator 21 has before him a console having four push buttons 26, 27, 28 and 29, one for each data component to be incorporated in the signal generated by the encoder 20. So, for example, as the operator observes the boxing match 10, if boxer A throws and lands a punch with his left hand, the operator will depress push button 26. If the operator observes that boxer A has thrown and landed a punch with his right hand, he will depress push button 27. Similarly, if boxer B throws and lands a punch with his left hand, the operator 21 will depress push button 28 and if boxer B throws and lands a punch with his right hand the operator will depress push button 29. When the data is encoded on a live basis, it will be apparent that the persons viewing the live match 10 could also be provided with gloves 23 incorporating receiver/actuators 24.

Instead of having the operator perform the encoding function while viewing the live match 10, it will be apparent from this description that the operator 21 could perform the encoding function while viewing an audiovisual recording of the match 10, in which case the signal generated by the encoder 20 could be incorporated in the audio signal on the tape after clearing the high end of the program audio as with a low pass filter having an appropriate cut-off frequency. For example, it may be desirable to have the operator perform the encoding function while viewing an audiovisual playback of each round, as this will provide the operator the opportunity to stop, and if necessary, replay in slow motion particular sequences to insure that the data in the signal generated by the encoder is accurate. This possibility is actually preferred where the encoded events comprise punches landed by the boxers as it is anticipated that punches will be thrown too quietly to allow the operator 21 to perform the encoding function on a "live" basis. In such event, it will be apparent that the recorded audiovisual presentation be broadcast to the remote locations 13 on a time-delayed basis and that the live audience cannot participate.

As diagrammatically illustrated in FIG. 2, the circuit for generating a signal encoded with data corresponding to punches landed by the boxers A and B comprises the low pass filter 25, a key latch and trigger circuit 40 which responds to inputs from the push buttons 26-29, four tone generators 41-44 which receives outputs from the circuit 40, an envelope generator 46 which also receives an output from the circuit 40, a modulator 48 which receives the combined outputs from the tone generators 41-44 and also receives the output from the envelope generator 46, a band pass filter 50 which receives the output from the modulator 48, and a mixer 52 which combines the audio signals output from the low-pass filter 25 and the band pass filter 50.

Figure 4:
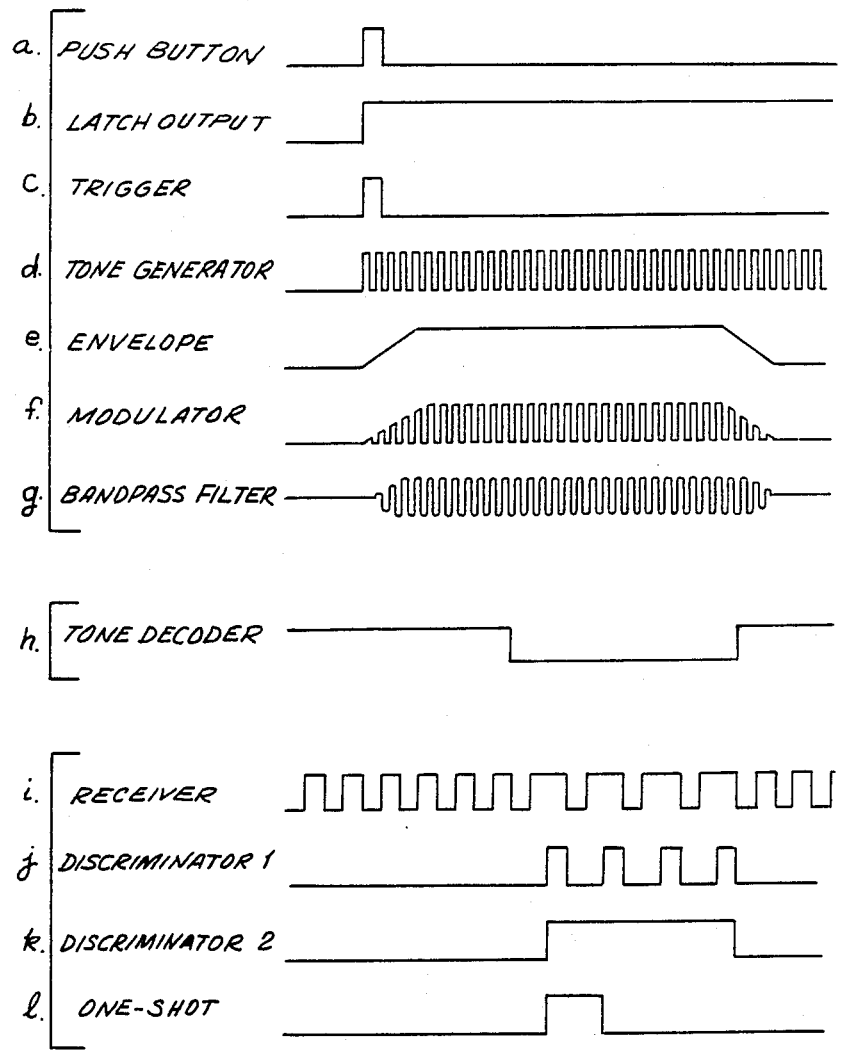
FIG. 4 is a graphical representation of the wave forms generated at various points throughout the preferred system.

A schematic of the presently preferred circuit for the encoder 20 is illustrated in FIG. 3. In FIG. 3, for purposes of illustration broken lines are utilized to segregate the push buttons 26-29, key latch and trigger circuit 40, tone generators 41-44, envelope generator 46, modulator 48, band pass filter 50 and the mixer 52. However, it should be recognized that the placement of the broken lines is somewhat arbitrary, i.e. particular circuit components could just as well be considered as part of one subcircuit as another. Accordingly, it should be recognized that the broken lines in FIG. 4 are not intended to definitively demarcate the various subcircuits. While the low pass filter 25 is not shown in FIG. 3, the circuitry for a suitable low pass filter is conventional, for example, the circuitry shown for the low pass filter 68 in FIG. 6 may be used.

Referring in detail to FIG. 3, the push button switches 26-29 are normally retained in an open switch position. One terminal of each switch 26-29 is connected to a 5 volt power supply and the other terminal is connected to one input of the key latch and trigger circuit 40 which, as shown, comprises an integrated circuit EPROM U1 and an integrated circuit latch U4. It will be apparent that when a particular push button switch 26-29 is depressed, a 5 volt signal is applied at the particular input of the EPROM connected to that switch. The wave form for the input signal applied to the inputs A0, A1, A2 and A3 of the EPROM upon depression of a switches 26-29 is shown in FIG. 4a. An RC circuit is disposed between each switch 26-29 and its respective input to the EPROM to filter extraneous noise which may accompany depression of the switch.

The combination of the EPROM U1 and the latch U4 serves several functions. First, each time a switch 26-29 is depressed for providing a data input to the EPROM U1, that data input is latched and committed to memory within the circuit even after the push button is released. This insures an input signal of suitable duration for generating a control tone. It will also be observed in FIG. 3 that there is a separate output line from the latch U4 for each of the four inputs to the EPROM U1. Since only one output from the latch U4 can be active at any given time, the circuit insures that there will be no overlap between control tones, i.e. the control tones will be serially transmitted. The output signal from the latch U4 in response to depression of the switches 26-29 is shown in FIG. 4b.

The EPROM U1 also generates a trigger signal at the pin D5 each time one of the inputs 26-29 is activated. This trigger signal is utilized to activate the envelope generator 46 for reasons that will be explained below. The trigger signal generated by the EPROM each time one of the switches 26-29 is depressed is shown in FIG. 4c.

Each of the four output signals from the latch and trigger circuit 40 is applied to one of the AND gates 54, 55, 56, 57, which may comprise a single quad AND gate. The other inputs to the AND gates 54-57 are the outputs from the tone generators 58, 59, 60 and 61, each of which generates a different frequency tone. The four frequencies produced by the four tone generators, 58, 59, 60 and 61, are, respectively, 7353 Hz, 8621 Hz, 10,000 Hz, and 11,905 Hz. The tone generators 58, 59, 60 and 61 are driven by a crystal oscillator circuit 62 which insures frequency accuracy. In the particular embodiment shown, the crystal oscillator X1 is a 4 MHz crystal oscillator, and the frequencies produced by the tone generators 58-61 are derived by digital division. As is usual, the oscillator circuit 62 includes a counter U3 the output of which is applied to the clock input of the four tone generators 58-61.

Since, as noted, only one of the four outputs from the latch and trigger circuit 40 is active at any given time, likewise only one output from the AND gates 58-61 is active at any given time. For example, if the output from the latch and trigger circuit 40 input to the AND gate 55 goes high, which corresponds to depression of the push button 26, the output signal from the AND gate 54 will be a signal having a frequency of 7353 Hz, corresponding to the output frequency generated by the tone generator 58. Likewise, when the output from the latch and trigger circuit 40 input to the AND gate 55 goes high, which corresponds to depression of the switch 27, a signal having a frequency of 8621 kHz will be generated at the output of the AND gate 55. The wave form at the output of the tone generators 58–61, which is also the wave form at the output of the AND gates 58–61 when the AND gates are active, is shown in FIG. 4d.

The outputs from the AND gates 58–61 are unified and applied to the modulator 48. As noted, only one of the AND gates 54–57 is active at any given time, so only one tone generator signal will be applied as the input to the modulator 48 at any given time. The modulator 48 functions essentially as a voltage-controlled amplifier. The control voltage for the modulator is generated by the envelope generator 46. The amplitude the signal allowed to pass through the modulator 48 is directly proportional to the control voltage applied by the envelope generator. As already noted, the envelope generator 46 generates an envelope each time an input to the latch and trigger circuit 40 is activated. Normally, the output of the envelope generator 46 rests at 0 volts, in which event there is no output from the modulator 48. When one of the system inputs is activated by depressing one of the switches 26–29, the envelope generator 46 generates the wave form illustrated in FIG. 4e. As shown, the envelope rises at a constant rate to a maximum level, remains at that level for a fixed duration, and then falls back to 0 volts at a constant rate. It will be apparent that by controlling the rate of rise and fall of the envelope signal, which in turn controls the rate of increase and decrease of the amplitude of the signal at the output of the modulator 48, a degree of control over the frequency spectrum of the tone bursts generated by the modulator is achieved.

The wave form at the output of the modulator 48 is shown in FIG. 4f. The particular frequency of the square waves at the output of the modulator 48 will, of course, depend upon the signal frequency of the tone generator applied to the particular active AND gate. If the envelope generator were not employed, i.e. if the tone generators were simply turned on and off with very rapid rise and fall times, objectionable audible "pops" or "clicks" would be generated. These noises are minimized by employing the envelope generator which, as noted, controls the rise and fall times of the modulator output signal.

The output of the modulator 48 is applied to a band pass filter 50 having a center frequency centered over the range of tones output from the tone generators 58–61. In FIG. 3, the band pass filter 50 has a center frequency of about 10 kHz. Referring to FIG. 4g, which shows the wave form at the output of the band pass filter 50, it may be seen that the band pass filter shapes the square-wave signal at the output of the modulator 48 to a more sinusoidal wave form, which serves to minimize the possibility of undesirable harmonic effects, such as aliasing with recording equipment bias frequencies or causing false harmonic locking of the tone decoders in the decoder/transmitters 22. In broadcast use, the band pass filter 50 also insures that no frequencies are generated which exceed the 15 kHz maximum for the audio portion of the television transmission.

Referring to FIGS. 2 and 3, the program audio is input to the encoder 20 at the jack J2 where it passes through the low pass filter (not shown in FIG. 3). As noted above, the low pass filter 25 removes the high frequency components from the program audio, in this case the audio portion of the boxing match, which might interfere with the control tones output from the band pass filter 50. As noted, the low pass filter 25 may have a cutoff frequency of 4 kHz.

The output of the band pass filter 50 comprising the control tones and the program audio minus any frequencies exceeding 4 kHz are combined by the mixer circuit 52 comprising the operational amplifier U15. The output from the mixer 52 is then broadcast in a conventional manner along with the program video. On the assumption of stereo transmission, the output from the mixer 52 is applied to both the right and left channels of the stereo broadcast. Suitable components for the encoder circuit of FIG. 3 are:

| DESIGNATOR | VALUE/TYPE | DESCRIPTION/RATINGS |
|---|---|---|
| R1 | 4M7 | ¼ W ±5% CARBON FILM |
| R2 | 1K | ¼ W ±5% CARBON FILM |
| R3 | 22K | ¼ W ±5% CARBON FILM |
| R4 | 22K | ¼ W ±5% CARBON FILM |
| R5 | 22K | ¼ W ±5% CARBON FILM |
| R6 | 22K | ¼ W ±5% CARBON FILM |
| R7 | 100K | ¼ W ±5% CARBON FILM |
| R8 | 1M5 | ¼ W ±5% CARBON FILM |
| R9 | 470K | ¼ W ±5% CARBON FILM |
| R10 | 10K | ¼ W ±5% CARBON FILM |
| R11 | 10K | ¼ W ±5% CARBON FILM |
| R12 | 10K | ¼ W ±5% CARBON FILM |
| R13 | 10K | ¼ W ±5% CARBON FILM |
| R14 | 1K | ¼ W ±5% CARBON FILM |
| R15 | 10K | ¼ W ±5% CARBON FILM |
| R16 | 10K | ¼ W ±5% CARBON FILM |
| R17 | 51K | ¼ W ±5% CARBON FILM |
| R18 | 33K | ¼ W ±5% CARBON FILM |
| R19 | 1K | ¼ W ±5% CARBON FILM |
| R20 | 1K | ¼ W ±5% CARBON FILM |
| R21 | 10K | AUDIO TAPER POTENTIOMETER |
| C1 | 33 PF | 16 V ±10% CERAMIC OR FILM |
| C2 | 100 NF | 16 V ±20% CERAMIC OR FILM |
| C3 | 100 NF | 16 V ±20% CERAMIC OR FILM |
| C4 | 100 NF | 16 V ±20% CERAMIC OR FILM |
| C5 | 100 NF | 16 V ±20% CERAMIC OR FILM |
| C6 | 47 NF | 16 V ±10% CERAMIC OR FILM |
| C7 | 22 NF | 16 V ±10% CERAMIC OR FILM |
| C8 | 10 NF | 16 V ±10% CERAMIC OR FILM |
| C9 | 3N3 | 16 V ±10% CERAMIC OR FILM |
| C10 | 1NF | 16 V ±10% CERAMIC OR FILM |

| DESIGNATOR | VALUE/TYPE | DESCRIPTION/RATINGS |
|---|---|---|
| | | -continued |
| C11 | 100 UF | 16 V +80/−20% ALUMINUM ELECTROLYTIC |
| C12 | 100 NF | 16 V ±20% CERAMIC OR FILM |
| C13 | 100 NF | 16 V ±20% CERAMIC OR FILM |
| C14 | 100 UF | 16 V +80/−20% ALUMINUM ELECTROLYTIC |
| U1 | 2716 | EPROM |
| U2 | CD4069 | HEX INVERTER |
| U3 | CD4024 | COUNTER |
| U4 | CD40175 | LATCH |
| U5 | CD4526 | COUNTER |
| U6 | CD4526 | COUNTER |
| U7 | CD4526 | COUNTER |
| U8 | CD4526 | COUNTER |
| U9 | CD4526 | COUNTER |
| U10 | CD4526 | COUNTER |
| U11 | CD4526 | COUNTER |
| U12 | CD4526 | COUNTER |
| U13 | CD4081 | QUAD AND GATE |
| U14 | LM351 | OPAMP |
| U15 | TL081 | OPAMP |
| U16 | LM7805 | VOLTAGE REGULATOR |
| Q1 | 2N5088 | GEN PURPOSE NPN |
| D1 | 1N4148 | GEN PURPOSE |
| X1 | 4MHz | CRYSTAL |
| J1 | 3.5 MM FEMALE | |
| J2, J3, J4 | RCA PHONO FEMALE | |
| POWER SUPPLY | 12VDC @ 200 MA | "BATTERY ELIMINATOR" TYPE PLUG-IN SUPPLY |

It will be apparent that the audiovisual broadcast will comprise the usual program video, the usual program audio attenuated, however, above 4 kHz, and the control tones encoded in the high end of audio range from about 7 to 12 kHz. Receiver locations not utilized with the system of the present invention will receive the usual audiovisual signal in a form suitable for audiovisual display.

At locations employing the system of the present invention, i.e. at locations having a decoder/transmitter 22, the incoming audiovisual signal is initially received, in the usual fashion, by an antenna or over a cable television line. Alternatively, if the audiovisual signal with encoded control tones has been recorded on a videocassette, the videocassette or a copy thereof may be utilized with the system of the present invention.

Figure 5:
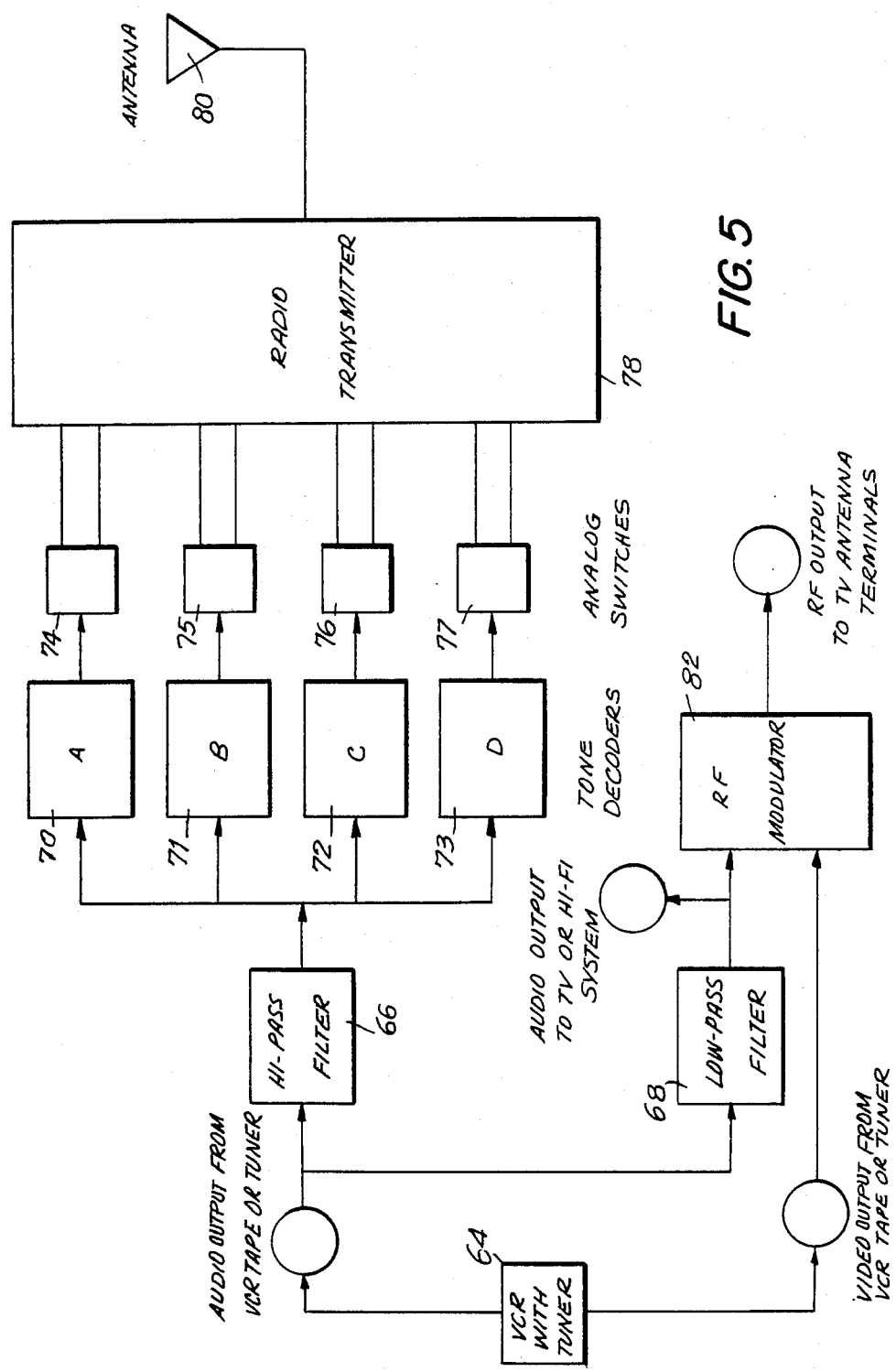
FIG. 5 is a diagrammatic representation of the decoder/transmitter section in the preferred system of the present invention.

As diagrammatically illustrated in FIG. 5, the decoder/transmitter section 22 of the present invention comprises a videocassette recorder 64 with separate outputs for the audio and video components of the audiovisual signal. The audio component is applied to a high pass filter 66 which filters out the usual program audio and passes the control tones, and a low pass filter 68 which separates out the control tones and passes the program audio. The output of the high pass filter 66 comprising the control tones is applied to four tone decoders 70, 71, 72 and 73 tuned, respectively, to the four control tone frequencies generated by the encoder 20. The output of each tone decoder 70–73 comprises a high or low digital signal depending upon whether the incoming signal includes that decoder's tuned frequency. The wave form of a typical output signal from one of the tone decoders 70–73 is shown in FIG. 4h.

The outputs of the tone decoders 70–73 are applied to analog switches 74, 75, 76 and 77, each of which opens and closes in response to the high and low output signals from its respective tone decoder. The outputs of the analog switches 74–77 are applied to a radio transmitter 78 capable of accepting and simultaneously transmitting four channels of information via the antenna 80. The signal from the antenna 80 is transmitted to the third and final section of the system in accordance with the present invention, namely, the receiver/actuator 24.

As also shown in FIG. 5, the output of the low pass filter 68 is applied, together with the video output signal from the VCR 64, to a conventional RF modulator 82 whose output comprises the usual program audiovisual signal i.e. an audiovisual signal of the boxing match. This signal is in a form suitable for transmission via a cable to the antenna terminals of a conventional television. The output of the low pass filter 68 which, as noted, comprises the program audio, may, as shown in FIG. 5, instead be input to a separate sound system or to a separate audio input of a television of the type which accepts a separate audio signal.

Figure 6:
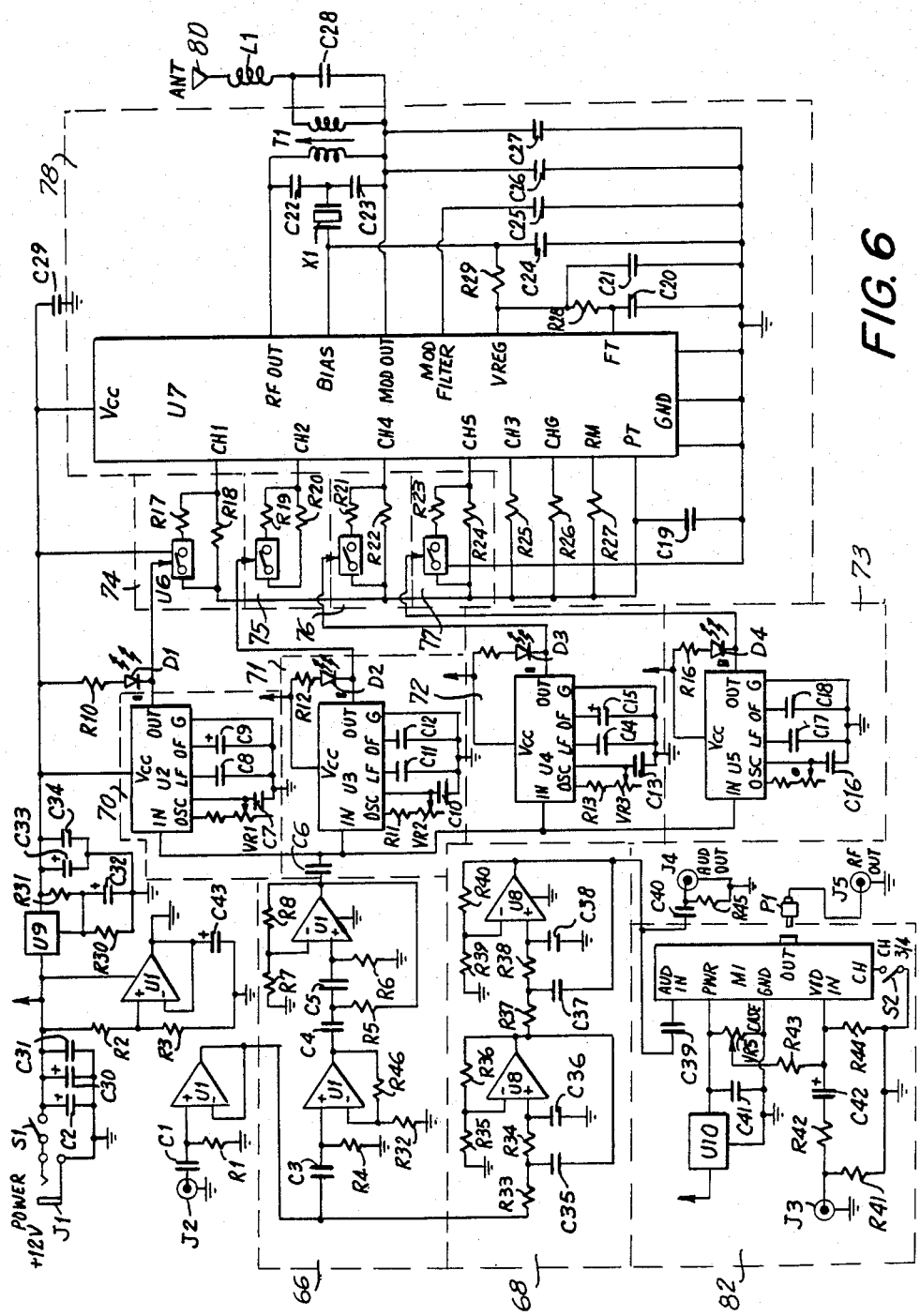
FIG. 6 is a schematic representation of the decoder/transmitter section of FIG. 5.

FIG. 6 is a schematic of a suitable circuit for the decoder/transmitter 22. As in the case of the schematic for the encoder 20, broken lines are utilized in FIG. 6 to segregate the major subcircuits of the decoder/transmitter diagrammatically shown in FIG. 5. Here too, however, it should be recognized that to some extent the placement of the broken lines is arbitrary and that particular components could just as well be considered as part of one subcircuit as another. Accordingly, it should be recognized that the broken lines are not intended to definitively demarcate the various subcircuits.

Referring now to FIG. 6 in detail, the audio output from the VCR is applied at the jack J2 and the video output from the VCR is applied at the jack J3. The audio input at J2 first passes through one section of a quad JFET operational amplifier U1 configured as a high impedance unity gain amplifier. The output from this amplifier is input to the high pass filter 66 and the low pass filter 68. As shown, the high pass filter 66 comprises two sections of the operational amplifier U1 configured as a three-pole high-pass filter having a cutoff frequency of 8.3 kHz and a passband gain of 8.5. As noted above, the high pass filter 66 attenuates the program audio and passes the control tones. The low pass filter 66 comprises a low-noise dual operational amplifier U8 configured as a four-pole low pass filter having a cut-off frequency of approximately 3.5 kHz. As also noted above, the low pass filter 66 attenuates the control tones to the point of inaudibility and passes the program audio.

The output from the high pass filter 66, which comprises the encoded control tones, is applied to the inputs of the four tone decoders 70, 71, 72 and 73, each of which comprises a commercially available integrated circuit tone decoder and its associated components. These integrated circuits, designated as U2, U3, U4 and U5 in FIG. 6, comprise phase-locked loop circuits and lock-detect circuitry which, in a manner well known in the art, provide a digital output signal which is low upon the detection of a specific input frequency and high at other times. Each of the integrated circuits U2-U5 is tuned to a specific one of the four control tones generated by the encoder 20. The bandwidths of the tone decoders are set to a maximum value of ±7% to accommodate speed variations in the VCR playback. The center frequencies of the tone decoders may be calibrated by variable resistors VR1, VR2, VR3 and VR4 incorporated in the tone decoders 70, 71, 72 and 73, respectively. For example, the variable resistors VR1-VR4 may be adjusted by a set screw. As also shown in FIG. 6, a light emitting diode is connected at the output of each of the tone decoders 70-73 to provide a visual indication upon the detection of the specific frequency for which the respective tone decoder is tuned. These light emitting diodes are designated as D1, D2, D3 and D4 in FIG. 6.

The outputs from the four tone decoders 70-73 are connected to four separate inputs of the radio transmitter circuit 78. The radio transmitter circuit 78 is based on a conventional integrated circuit LM1871 manufactured by National Semiconductor Corp., Santa Clara, Calif. The circuit configuration for the LM1871 illustrated in FIG. 6 is substantially that shown in FIG. 2 on page 5 of the data sheet for the LM1871 dated January, 1980. As shown in FIG. 6, analog switches 74, 75, 76 and 77 are interposed between the outputs from the four tone decoders 70, 71, 72 and 73 and the inputs to the radio transmitter 78. The analog switches 74, 75, 76 and 77 are followed by resistors R17, R19, R21 and R23, respectively. The pulse widths input to the radio transmitter 78 are controlled by utilizing the analog switches 74-77 to switch the resistors R17, R19, R21 and R23 in and out of the circuit under control of the tone decoders 70-73. The output from the radio transmitter 78 is applied to an antenna 80 which transmits the control tones to the receiver/decoders 24 worn by the viewers 12.

Still referring to FIG. 6, and as noted above, the output from the low pass filter 68 comprises the usual program audio. If the viewer was a television with an external audio input or if the VCR 64 is connected to a sound system, the output signal from the low pass filter 68 may be applied directly to the television's external audio input or the sound system, respectively. In such event, the video output from the VCR 64 is connected directly to the television as video input. For viewers who do not have a television with external audio and video inputs or a sound system connected to the VCR, an RF modulator 82 is incorporated in the decoder/transmitter 22. As shown in FIGS. 5 and 6, the RF modulator combines the program audio from the low pass filter 68 with the program video from the VCR 64 and modulates the combined signal to a frequency suitable for reception by a television at its antenna input. Suitable components for the decoder/transmitter circuit of FIG. 6 are:

| DESIGNATOR | VALUE/TYPE | DESCRIPTION/RATINGS |
|---|---|---|
| R1 | 22K | ¼ W ±5% CARBON FILM |
| R2 | 10K | ¼ W ±5% CARBON FILM |
| R3 | 10K | ¼ W ±5% CARBON FILM |
| R4 | 4K3 | ¼ W ±5% CARBON FILM |
| R5 | 9K1 | ¼ W ±5% CARBON FILM |
| R6 | 9K1 | ¼ W ±5% CARBON FILM |
| R7 | 39K | ¼ W ±5% CARBON FILM |
| R8 | 56K | ¼ W ±5% CARBON FILM |
| R9 | 12K | ¼ W ±5% CARBON FILM |
| R10 | 680 | ¼ W ±5% CARBON FILM |
| R11 | 10K | ¼ W ±5% CARBON FILM |
| R12 | 680 | ¼ W ±5% CARBON FILM |
| R13 | 16K | ¼ W ±5% CARBON FILM |
| R14 | 680 | ¼ W ±5% CARBON FILM |
| R15 | 16K | ¼ W ±5% CARBON FILM |
| R16 | 680 | ¼ W ±5% CARBON FILM |
| R17 | 47K | ¼ W ±5% CARBON FILM |
| R18 | 240K | ¼ W ±5% CARBON FILM |
| R19 | 47K | ¼ W ±5% CARBON FILM |
| R20 | 240K | ¼ W ±5% CARBON FILM |
| R21 | 47K | ¼ W ±5% CARBON FILM |
| R22 | 240K | ¼ W ±5% CARBON FILM |
| R23 | 47K | ¼ W ±5% CARBON FILM |
| R24 | 240K | ¼ W ±5% CARBON FILM |
| R25 | 750K | ¼ W ±5% CARBON FILM |
| R26 | 82K | ¼ W ±5% CARBON FILM |
| R27 | 75K | ¼ W ±5% CARBON FILM |
| R28 | 150K | ¼ W ±5% CARBON FILM |
| R29 | 22K | ¼ W ±5% CARBON FILM |
| R30 | 1K5 | ¼ W ±5% CARBON FILM |
| R31 | 240 | ¼ W ±5% CARBON FILM |
| R32 | 3K3 | ¼ W ±5% CARBON FILM |
| R33 | 33K | ¼ W ±5% CARBON FILM |
| R34 | 33K | ¼ W ±5% CARBON FILM |
| R35 | 33K | ¼ W ±5% CARBON FILM |
| R36 | 24K | ¼ W ±5% CARBON FILM |
| R37 | 18K | ¼ W ±5% CARBON FILM |

-continued

| DESIGNATOR | VALUE/TYPE | DESCRIPTION/RATINGS |
|---|---|---|
| R38 | 18K | ¼ W ±5% CARBON FILM |
| R39 | 13K | ¼ W ±5% CARBON FILM |
| R40 | 22K | ¼ W ±5% CARBON FILM |
| R41 | 82 | ¼ W ±5% CARBON FILM |
| R42 | 220 | ¼ W ±5% CARBON FILM |
| R43 | 1K8 | ¼ W ±5% CARBON FILM |
| R44 | 1K8 | ¼ W ±5% CARBON FILM |
| R45 | 22K | ¼ W ±5% CARBON FILM |
| R46 | 10K | ¼ W ±5% CARBON FILM |
| VR1 | 5K | 10 OR 20-TURN CERMET TRIMMER |
| VR2 | 5K | 10 OR 20-TURN CERMET TRIMMER |
| VR3 | 5K | 10 OR 20-TURN CERMET TRIMMER |
| VR4 | 5K | 10 OR 20-TURN CERMET TRIMMER |
| VR5 | 5K | SINGLE-TURN CARBON OR PLASTIC TRIMMER |
| C1 | 100 NF | 16 V ±20% CERAMIC OR FILM |
| C2 | 2200 UF | 25 V +80/−20% ALUMINUM ELECTROLYTIC |
| C3 | 1N8 | 16 V ±5% CERAMIC OR FILM |
| C4 | 1N8 | 16 V ±5% CERAMIC OR FILM |
| C5 | 1N8 | 16 V ±5% CERAMIC OR FILM |
| C6 | 4N7 | 16 V ±20% CERAMIC OR FILM |
| C7 | 10 NF | 16 V ±5% CERAMIC OR FILM LOW TEMPCO |
| C8 | 100 NF | 16 V ±20% CERAMIC OR FILM |
| C9 | 1 UF | 16 V ±10% ALUMINUM ELECTROLYTIC |
| C10 | 10 NF | 16 V ±5% CERAMIC OR FILM LOW TEMPCO |
| C11 | 100 NF | 16 V ±20% CERAMIC OR FILM |
| C12 | 1 UF | 16 V ±10% ALUMINUM ELECTROLYTIC |
| C13 | 4N7 | 16 V ±5% CERAMIC OR FILM LOW TEMPCO |
| C14 | 100 NF | 16 V ±20% CERAMIC OR FILM |
| C15 | 1 UF | 16 V ±10% ALUMINUM ELECTROLYTIC |
| C16 | 4N7 | 16 V ±5% CERAMIC OR FILM LOW TEMPCO |
| C17 | 100 NF | 16 V ±20% CERAMIC OR FILM |
| C18 | 1 UF | 16 V ±10% ALUMINUM ELECTROLYTIC |
| C19 | 4N7 | 16 V ±5% CERAMIC OR FILM LOW TEMPCO |
| C20 | 100 NF | 16 V ±5% CERAMIC OR FILM LOW TEMPCO |
| C21 | 100 NF | 16 V ±20% CERAMIC OR FILM |
| C22 | 47 PF | 16 V ±5% CERAMIC OR MICA |
| C23 | 220 PF | 16 V ±5% CERAMIC OR MICA |
| C24 | 62 PF | 16 V ±5% CERAMIC OR MICA |
| C25 | 10 NF | 16 V ±10% CERAMIC OR FILM |
| C26 | 1N5 | 16 V ±10% CERAMIC OR FILM |
| C27 | 2N7 | 16 V ±10% CERAMIC OR FILM |
| C28 | 33 PF | 16 V ±5% CERAMIC OR MICA |
| C29 | 100 NF | 16 V ±20% CERAMIC OR FILM |
| C30 | 1 UF | 25 V ±20% TANTALUM ELECTROLYTIC |
| C31 | 100 NF | 25 V ±20% CERAMIC OR FILM |
| C32 | 10 UF | 16 V ±20% TANTALUM ELECTROLYTIC |
| C33 | 1 UF | 16 V ±20% TANTALUM ELECTROLYTIC |
| C34 | 100 NF | 25 V ±20% CERAMIC OR FILM |
| C35 | 2N7 | 16 V ±5% CERAMIC OR FILM |
| C36 | 2N7 | 16 V ±5% CERAMIC OR FILM |
| C37 | 2N7 | 16 V ±5% CERAMIC OR FILM |
| C38 | 2N7 | 16 V ±5% CERAMIC OR FILM |
| C39 | 47 NF | 25 V ±20% CERAMIC OR FILM |
| C40 | 100 NF | 16 V ±20% CERAMIC OR FILM |
| C41 | 4U7 | 16 V ±20% TANTALUM ELECTROLYTIC |
| C42 | 100 UF | 16 V +80/−20% ALUMINUM ELECTROLYTIC |
| C43 | 22 UF | 16 V +80/−20% ALUMINUM ELECTROLYTIC |
| U1 | LM347 | QUAD JFET OPAMP |
| U2 | LM/NE567 | TONE DECODER PLL |
| U3 | LM/NE567 | TONE DECODER PLL |
| U4 | LM/NE567 | TONE DECODER PLL |
| U5 | LM/NE567 | TONE DECODER PLL |
| U6 | CD4066 | QUAD ANALOG SWITCH |
| U7 | LM1871 | RADIO TRANSMITTER |
| U8 | TL072 | LOW-NOISE DUAL OPAMP |
| U9 | LM317L | ADJUSTABLE VOLTAGE REGULATOR |
| U10 | LM78L05 | 5 V REGULATOR |
| D1, D2, D3, D4 | | 10 MA LED |
| M1 | ASTEC UM1285-8 | RF MODULATOR MODULE |
| T1 | TOKO KEN4635BJE | RF TRANSFORMER |
| L1 | J. W. MILLER M7010 1 uH | RF INDUCTOR |
| X1 | 49.XXXX MHz | CRYSTAL 455 kHz AWAY FROM RCVR XTAL |
| ANT | | 24-INCH WHIP TELESCOPIC ANTENNA |
| J1 | | 3.5 MM 2-CONDUCTOR FEMALE |
| J2 | | RCA PHONO FEMALE |
| J3 | | RCA PHONO FEMALE |

| -continued | | |
|---|---|---|
| DESIGNATOR | VALUE/TYPE | DESCRIPTION/RATINGS |
| J4 | | RCA PHONO FEMALE |
| J5 | | VIDEO RF FEMALE |
| P1 | | RCA PHONO MALE |
| POWER SUPPLY | 12VDC @ 200 MA | PLUG-IN "BATTERY ELIMINATOR" TYPE POWER SUPPLY |

Figure 7:
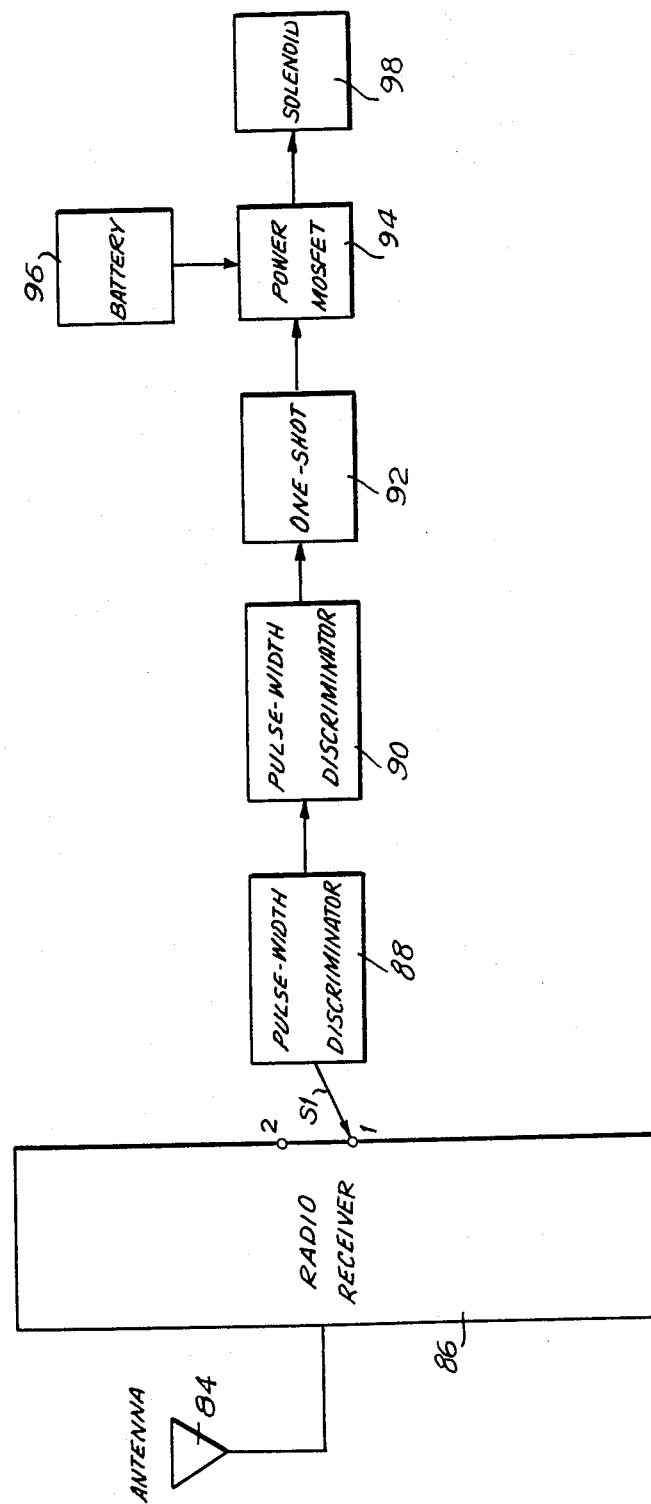
FIG. 7 is a diagrammatic representation of the receiver/actuator section in the preferred system in accordance with, the present invention.

The receiver/actuator 24 is diagrammatically illustrated in FIG. 7. As described below in greater detail with reference to FIGS. 9 and 10, the components comprising the receiver/actuator 24 are incorporated in gloves 23 worn by the viwers 12. As shown in FIG. 7, the receiver/actuator 24 comprises an antenna 84 which receives the signal transmitted by the radio transmitter 78 via antenna 80. The output of the antenna 84 is applied to a radio receiver 86. Each receiver 86 is hard wired to receive left hand signals or right hand signals. That is, each receiver 86 is hard wired to receive signals indicative of punches landed by the left hands of boxers A and B or by the right hands of boxers A and B. A switch S1 in the receiver/actuator 24 enables the viewer 12 to select as between the two boxers. So, if a viewer wearing a left hand glove and a right hand glove throws the switches S1 in the gloves to the "A" position, the receiver 86 in the left hand glove will transmit data representing punches landed by the left hand of boxer A, and the receiver 86 in the right hand glove will transmit data representing punches landed by the right hand of boxer A. Similarly, if the switches S1 in the gloves are switched to the "B" position, the receiver 86 in the left hand glove will transmit data representing punches landed by the left hand of boxer B, and the receiver 86 in the right hand glove will transmit data representing punches landed by the right hand of the boxer B.

The output of the radio receiver 86 comprises a train of pulses whose width varies upon the reception of a signal from the transmitter 78. Two pulse width discriminators 88 and 90 convert the output from the receiver 86 to a digital logic signal which is high in response to a pulse width indicating reception of a signal from the transmitter 78 and low in the absence of a signal from the transmitter.

The logic signal at the output of the second pulse width discriminator 90 operates a power MOSFET 94 operating as a switch connecting the battery 96 to the solenoid 98. The one-shot 92 interposed between the output of the second pulse width discriminator 90 and the power MOSFET 94 insures that the power MOSFET 94 is never constantly on, which would result in a rapid drain of the battery 96. In the absence of the one shot 92, a constant on state could occur, for example, upon a loss of radio contact between the transmitter 78 and the receiver 86.

Figure 9:
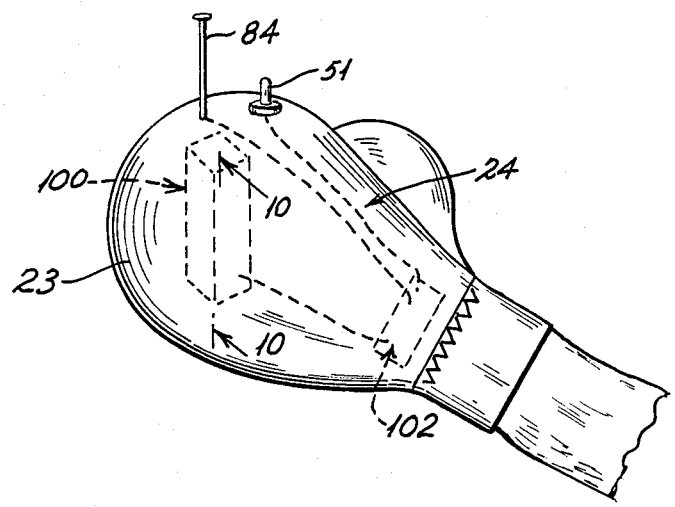
FIG. 9 is a side elevational view showing the receiver/actuator incorporated in a boxing glove.

The solenoid 98, described in greater detail in FIG. 9, applies a rap across the knuckles of the viewer 12 each time the power MOSFET 94 is switched on. Consequently, and as will be apparent from the foregoing description, in the case of a left hand glove in the "A" switch position, the solenoid 98 will apply a rap across the knucles of the viewer 12 each time boxer A lands a punch with his left hand. Similarly, the solenoid 98 in the right hand glove will apply a rap across the knuckles of the right hand of the viewer 12 each time the boxer A lands a punch with his right hand. By adjusting the switch S1 to the "B" position, raps will be felt across the knuckles of the viewer in accordance with punches landed by boxer B.

Figure 8:
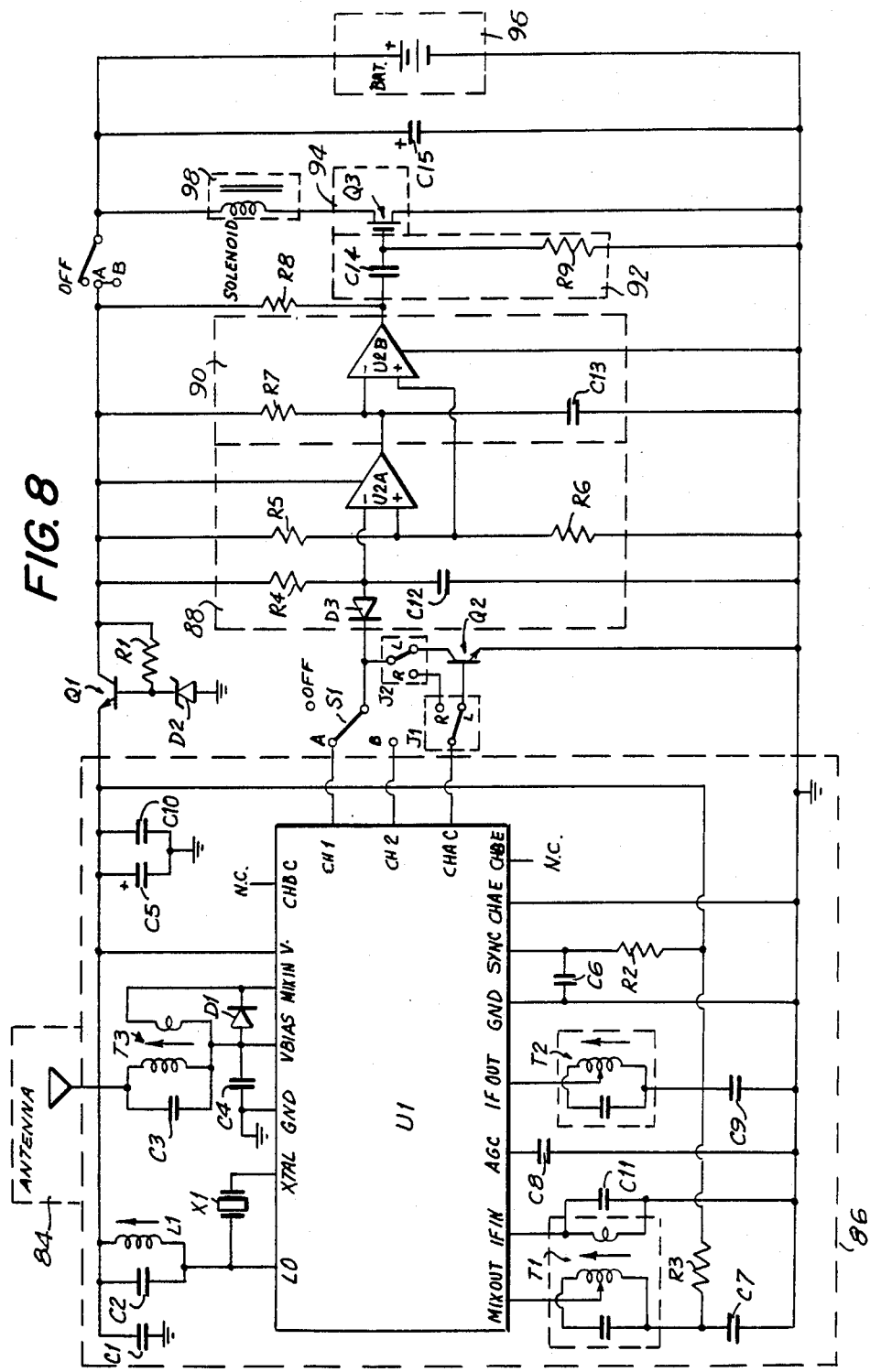
FIG. 8 is a schematic representation of the receiver/actuator section shown in FIG. 7.

A schematic of the presently preferred circuit for the receiver/actuator 24 is illustrated in FIG. 8. As before, it should be recognized that the placement of the broken lines utilized in FIG. 8 to segregate the subcircuits of the receiver/actuator 24 is somewhat arbitrary, i.e. particular circuit components could just as well be considered part of one subcircuit as another.

The signal transmitted by the transmitter 78 via the antenna 80 is detected in the receiver/actuator 24 by the antenna 84, the output of which is applied to the radio receiver 86. The receiver 86 comprises a National Semiconductor LM1872 superheterodyne receiver/remote control integrated circuit operating in the 49 MHz band. The LM1872, designated as U1 in FIG. 8, is specifically designed to operate in conjunction with the LM1871 intergrated circuit transmitter selected as the transmitter 78 in FIG. 6. The circuit configuration for the LM1872 shown in FIG. 8 is substantially that shown in the December, 1979 National Semiconductor handbook for the LM1872, with the additional circuit connections shown in FIG. 11 of the handbook, which comprise modifications for receiving the four independant channels transmitted by the transmitter 78.

As noted above, each receiver/actuator unit 24 is hardwired for either a right or left-hand glove. Those wired for left-hand gloves only receive control tones representing punches landed by the left hands of the boxers A and B, while those wired for a right-hand glove only receive control tones representing punches landed by the right hands of the boxers. Hardwiring for either a right or left-hand glove is effected during assembly, and shown in diagrammatic form by the jumpers J1 and J2 in FIG. 8, which are either both wired to the right R terminals (right-hand glove) or the left L terminals (left-hand glove). For those receivers 86 wired for right-hand gloves, the transistor Q2 is not necessary.

Figure 10:
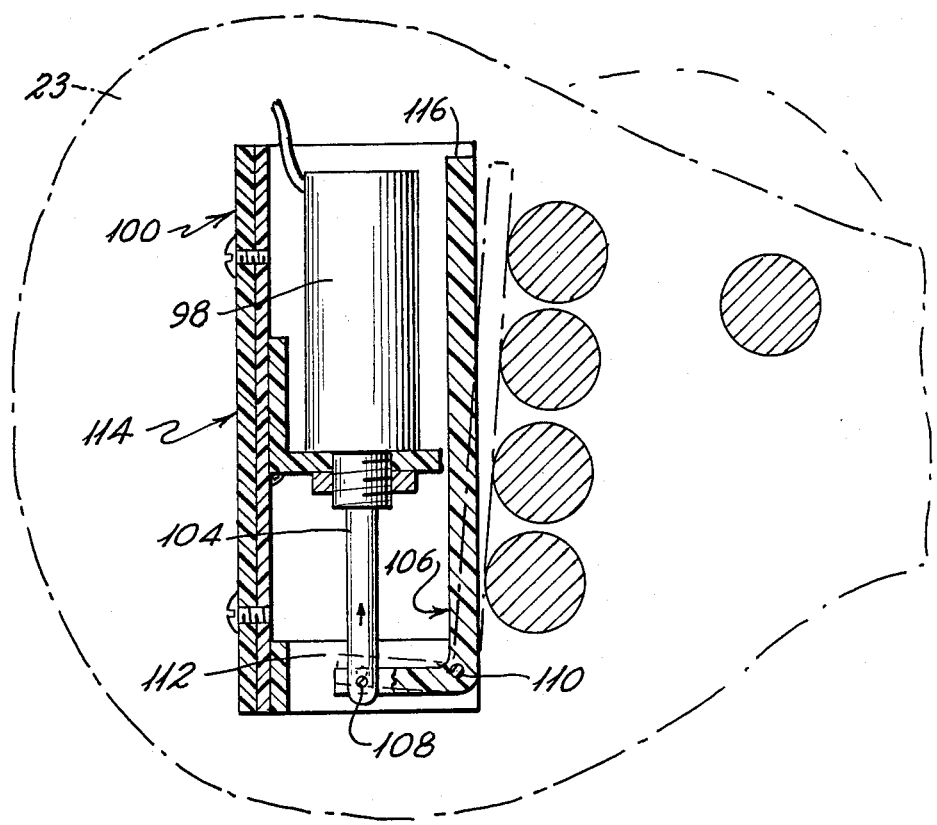
FIG. 10 is a sectional view taken substantially along the lines 10—10 in FIG. 9.

As noted above, the switch S1 allows the user to select as between boxers A and B. The CH1 port of the integrated circuit U1 in FIG. 8 outputs a signal indicative of punches landed by boxer A, and the CH2 port outputs a signal indicative of punches landed by boxer B. The viewer 12 can select as between these two positions by toggling the switch S1 which, as shown in FIG. 10, is accessible on the viewer's gloves 23. So, for example, if the switch S1 is in the "A" position in FIG. 8, and jumpers J1 and J2 are wired for a right-hand glove, the circuit will provide a signal indicative of punches landed by the right hand of boxer A. If the switch S1 is in the "B" position, and still assuming that the jumpers J1 and J2 are wired for a right-hand glove, the circuit will provide a signal indicative of punches landed by the right hand of boxer B. Similarly, if the jumpers J1 and J2 are wired for a left-handed glove and the switch S1 is in the "A" position, the circuit will provide a signal indicative of punches landed by the left hand of boxer A and when the switch S1 is in the "B" position the circuit will provide a signal indicative of punches landed by the left hand of boxer B.

Referring to FIG. 4i, a typical wave form at the output ports CH1 and CH2 of the receiver 86 is illustrated. As shown, the output from these ports comprises a variable width pulse train. More specifically, and assuming that the receiver 86 is wired as shown in FIG. 8, i.e. for punches landed by the left hand of boxer A, the output from the port CH1 remains a narrow width pulse train until a control tone representative of a punch landed by the left hand of boxer A is picked up by the antenna 84, whereupon the pulse width of the pulse train temporarily widens. In FIG. 4i, the pulse width of the pulse train at the port CH1 is shown to widen for four pulses upon the detection of a control tone indicating a punch landed by the left-hand of boxer A.

The pulse train from the port CH1 is next applied to the diode D3 which, in conjunction with resistor R4 and capacitor C12 form a peak detector. This peak detector, in conjunction with the operational amplifier U2A configured as a comparator, comprises the first pulse width discriminator 88. As shown in FIG. 4j, the output of the discriminator 88 is low as long as the pulse train at the output port CH1 comprises narrow pulses.

In this mode, the capacitor C12 is discharged sufficiently often that it never rises above the threshhold set by resistors R5 and R6. Consequently, the open collector type output of the comparator U2A sits open circuit. When wider pulses appear at the port CH1, i.e., when a control tone indicative of a punch landed by the left hand of boxer A is detected, the output of the discriminator 88 becomes a narrow width pulse train. In this mode, C12 is charged beyond the threshhold set by the resistors R5 and R6, causing the output of the comparator U2A to briefly short to ground on each pulse.

The output from the first pulse-width discriminator 88 is applied to a second pulse-width discriminator 90.

As shown in FIG. 8, the second pulse width discriminator 90 comprises resistor R7 and capacitor C13 functioning as a second peak detector, and operational amplifier U2B configured as a comparator. As shown in FIG. 4k, the output from the second discriminator 90 sits low as long as the output from the first discriminator 88 sits low. However, when the output from the first discriminator 88 comprises a narrow pulse train, the output of comparator U2A shorts to ground through C13, whereupon the output of U2B goes high, pulled up by the resistor R8. As shown in FIG. 4k, the pulse at the output of the second discriminator 90 is of a duration corresponding to the duration of the pulse train at the output of the first discriminator 88.

A high output from U2B triggers the power MOSFET 94, Q3, through an AC coupling network comprised of capacitor C14 and resistor R9 which function as the one-shot 92. Triggering of the power MOSFET 94 activates the solenoid 98 which is powered by the battery 96. As described below in connection with FIGS. 9 and 10, activation of the solenoid 98 applies a rap across the knuckles of the viewer's hand. The time constant of the one shot 92 comprised of capacitor C14 and resistor R9 is selected to be larger than the normal firing pulse width at the output of U2B. This insures that the solenoid 98 does not remain activated for an excessive period of time, such as may occur from component failure or a loss of reception at the receiver 86. This not only saves the solenoid 98, but also protects the battery 96 from a potentially dangerous high rate of discharge. The wave form at the output of the one-shot 92 is shown in FIG. 4l. The capacitor C15 in FIG. 8 functions as an energy reservoir that recharges between pulses from the Mosfet for increasing the power available to the solenoid upon each actuation thereof. Suitable components for the receiver/actuator circuit of FIG. 8 are:

| DESIGNATOR | VALUE/TYPE | DESCRIPTION/RATINGS |
| --- | --- | --- |
| R1 | 470 | ¼ W ±5% CARBON FILM |
| R2 | 100K | ¼ W ±5% CARBON FILM |
| R3 | 200 | ¼ W ±5% CARBON FILM |
| R4 | 27K | ¼ W ±5% CARBON FILM |
| R5 | 10K | ¼ W ±5% CARBON FILM |
| R6 | 20K | ¼ W ±5% CARBON FILM |
| R7 | 1 M | ¼ W ±5% CARBON FILM |
| R8 | 10K | ¼ W ±5% CARBON FILM |
| R9 | 1 M | ¼ W ±5% CARBON FILM |
| C1 | 10 NF | 16 V ±20% CERAMIC OR FILM |
| C2 | 24 PF | 16 V ±5% CERAMIC OR MICA |
| C3 | 24 PF | 16 V ±5% CERAMIC OR MICA |
| C4 | 100 NF | 16 V ±20% CERAMIC OR FILM |
| C5 | 22 UF | 10 V ±20% TANTALUM ELECTROLYTIC |
| C6 | 47 NF | 16 V ±5% CERAMIC OR FILM |
| C7 | 10 NF | 16 V ±20% CERAMIC OR FILM |
| C8 | 100 NF | 16 V ±20% CERAMIC OR FILM |
| C9 | 10 NF | 16 V ±20% CERAMIC OR FILM |
| C10 | 10 NF | 16 V ±20% CERAMIC OR FILM |
| C11 | 1 NF | 16 V ±5% CERAMIC OR FILM |
| C12 | 47 NF | 16 V ±5% CERAMIC OR FILM |
| C13 | 47 NF | 16 V ±5% CERAMIC OR FILM |
| C14 | 100 NF | 16 V ±20% CERAMIC OR FILM |
| C15 | 2200 UF (OR MORE) | 16 V +80/−20% ALUMINUM ELECTROLYTIC |
| U1 | LM1872 | RADIO RECEIVER |
| U2 | LM319 | DUAL COMPARATOR |
| D1 | 1N4148 or EQUIV. | SIGNAL DIODE |
| D2 | 1N754 OR EQUIV | 6.8 V ±10% 100 MW ZENER DIODE |
| D3 | 1N4148 or EQUIV. | SIGNAL DIODE |
| Q1 | 9014 C | GENERAL PURPOSE NPN |
| Q2 | 9014 C | GENERAL PURPOSE NPN (LEFT-HAND UNITS ONLY) |
| Q3 | IRF 543 | POWER MOSFET |
| X1 | 49.XXXX MHz | CRYSTAL 455 KHz AWAY FROM |

| DESIGNATOR | VALUE/TYPE | DESCRIPTION/RATINGS |
|---|---|---|
| | | XMITTR XTAL |
| L1 | .4 uH @ 49 mHz | TOKO TYPE KEN-4028 DZ |
| T1 | 455 kHz MIXER | TOKO TYPE RMC-202313 NO |
| T2 | 455 kHz IF | TOKO TYPE RMC-402503 NO |
| T3 | | TOKO TYPE KEN-4028 DZ |
| S1 | DPDT CENTER OFF | SUBMINIATURE SWITCH |
| ANTENNA | | 12-INCH WHIP OR 49 MHZ RESONANT COIL ANTENNA |
| SOLENOID | | ELECTRO-MECHANISMS INC. MODE TPO 30-1.5 |
| BTTRY | | 9 V ALKALINE BATTERY |

FIGS. 9 and 10 show the receiver/actuator 24 incorporated in a glove 23. In FIG. 9, the solenoid unit comprising the solenoid 98 and its housing is generally designated at 100 and the balance of the circuitry for the receiver/actuator 24 is generally designated by a diagrammatically illustrated circuit board 102. As shown, the solenoid unit 100 is incorporated in the glove 23 above the knuckles of the viewer's hand and the circuit board 102 is incorporated in the wrist portion of the glove. The antenna 84 protrudes through the glove to pick up signals transmitted by the transmitter 78 in the decoder/transmitter 22. The switch S1 also protrudes through the glove to enable the viewer to select as between boxer A and boxer B. In FIGS. 9 and 10, the receiver/actuator 24 is incorporated in a left-hand glove and hence the jumpers J1 and J2 are wired as shown in FIG. 8.

Still referring to FIGS. 9 and 10, the solenoid 98 is incorporated in the glove 23 such that its plunger 104 is substantially parallel to the knuckles of the viewer's hand, in this case the viewer's left hand. An actuator, shown as an L-shaped member 106 in FIGS. 9 and 10, is connected to the plunger 104 by a pin 108 extending through the short arm of the member 106. The member 106 is joined at its bend by another pin 110 to two posts 112 secured to the solenoid housing 114 on either side of the plunger 104 whereby the member 106 pivots about the pin 110 as the plunger 104 is retracted upon activation of the solenoid 98.

As a consequence of this arrangement, it will be apparent that each time the plunger 104 is retracted upon activation of the solenoid 98, the long arm 116 of the member 106 moves toward the viewer's knuckles (dotted lines in FIG. 10) for applying a gentle rap across the viewer's knuckles. When the solenoid 98 is deactivated, a return spring (not shown) returns the member 106 to its original position wherein the member 106 is spaced from the viewer's knuckles. It will be apparent that when the member 106 returns to its original position under the influence of the return spring, the plunger 104 is simultaneously returned to its unretracted position by the member 106 acting through the pin 108.

It will be apparent, therefore, that in the case of the glove shown in FIGS. 9 and 10, each time a control tone indicative of a punch landed by the left hand of boxer A is picked up by the antenna 84, the plunger 104 will retract and the member 106 will apply a rap across the viewer's knuckles. If the viewer wishes to be tactilely stimulated, instead, each time boxer B lands a punch with his left hand, the viewer need only throw the switch S1 to the "B" position. Of course, it is contemplated that the viewer will also have a receiver/actuator unit 24 incorporated in a glove worn on the viewer's right hand, with that receiver/actuator hard wired to detect control tones indicative of punches landed by the right hands of the boxers A and B. The operation of the receiver/actuator 24 in the right-hand glove will be apparent from the foregoing, and hence no further description thereof is deemed necessary.

It will consequently be apparent that by employing the system of the present invention, viewers 12 at locations remote from the live boxing match 10 may be tactilely stimulated in response to specific events occurring during the boxing match 10, in this case punches landed by the left and right hands of boxers A and B. This additional tactile enhancement of the viewers 12 provides an enhanced sense of "participation" in the match, thereby significantly enhancing the enjoyment of the viewers as they watch the match.

Once this description is known, it will be apparent that viewers may be stimulated in response to other events occurring during the live boxing match 10, such as body punches received by each of the boxers A and B. The only modifications required to the foregoing system would be proper encoding by the operator 21 and appropriate actuators disposed about the bodies of the viewers 12.

It will be further apparent that viewers 12 can be tactilely stimulated in response to other than a boxing match 10. For example, instead of a boxing match 10, the viewers may be tactilely stimulated in response to events occurring during a concert. For example, the events may comprise specific frequencies in the music, with a special control generated in response to each such specific frequency. In the case of a concert, it is contemplated that the control tones will be generated automatically by appropriate electronic circuitry responsive to the sounds generated at the concert. In such event, the operator 21 may be dispensed with. As circuitry for distinguishing between specific audio frequencies and for driving the encoder 20 for generating control tones indicative of such specific frequencies is well known in the art, a further description thereof is not deemed necessary. In such an embodiment, one or more receiver/actuators could be incorporated in a band worn about the viewers' chests or stomachs. The actuators would provide, for example, a different form of tactile stimulation, i.e. tactile stimulation at different locations or with different intensities, in response to different control tones. For example, the band could incorporate four receiver/actuators 24 at spaced locations with each wired to receive a different control tone. Alternatively, a single receiver/actuator incorporated in the band could provide tactile stimulation at different intensities in response to different control tones. In embodiments such as this where the control tones are generated automatically during the presentation even viewers watching the live presentation may be tactilely stimulated in accordance with the system of the present invention.

Of course, instead of a boxing match, concert, or other audiovisual presentation, the viewers 12 may be tactilely stimulated in response to events occurring during a purely audio or video presentation. For example, the control tones could be incorporated in a record album or cassette player, in which event the output from the record player or cassette player, instead of being applied directly to an amplifier, would instead be applied to the high and low pass filters 66 and 68 of the decoder/transmitter 22, with the output of the low pass filter being applied to the amplifier. Again, the control tones may indicate specific frequencies in the music, with the tactile stimulation comprising raps to the viewer's chest or abdomen as applied by one or more receiver/actuators 24 incorporated in a band worn about the viewer's torso.

It will further be apparent that the apparatus of the present invention may be utilized to effect stimulation other than tactile stimulation, i.e., the actuator incorporated in the gloves 23 in the system described above could be employed as an actuator for effecting other than tactile stimulation. Such an arrangement would have particular application to video games, though other applications are possible. For example, many video games are premised on a combat principle, such as tank warfare. By employing the system of the present invention, three dimensional toy tanks in the viewer's home could be equipped with receiver/actuators that respond to control tones encoded in the game audio at the high end of the audio frequency spectrum. In such event, the receiver/actuators in the tanks could perform a variety of functions, such as controlling the movement of the tank or firing of the tank as simulated by a sound emanating from the tank. Of course, this modification could be employed with other video games and other audiovisual presentations of the type displayed on a video monitor.

Indeed, it will be apparent that the receiver/actuators could be employed to effect a wide variety of different types of stimulation including, for example, olfactory stimulation, depending upon the nature of the presentation and the specific events therein for which concurrent stimulation is desired. Of course, this assumes that the receiver/actuators are connected to appropriate apparatus for initiating the desired stimulation such as, in the case of olfactory stimulation, a valve which would release a particular odor in response to activation of the actuator. As such apparatus and its manner of connection to an actuator of the type contemplated herein is well within the capabilities of the person of ordinary skill in the art, a further description thereof is deemed unnecessary.

It will also be apparent from the foregoing description that while in the preferred system in accordance with the present invention the data representative of the events occurring during the audiovisual presentation is encoded at the high end of the audio frequency range, that is not absolutely necessary, and the data could be encoded, for example, in the video signal. In such event, it will be apparent that the decoder/transmitter 22 must incorporate appropriate circuitry for decoding the data from the video signal and for transmitting that data to the receiver/actuator 24. As such circuitry will be apparent to the person of ordinary skill in the art once this description is known, a further description thereof is deemed unnecessary.

A still other alternative for transmitting the data from the encoder 20 to the decoder/transmitter 22 is presented by so-called second audio program or SAP broadcasts. These broadcasts basically comprise a conventional two channel stereo broadcast accompanied by a third channel which is typically used for a bilingual transmission. In such broadcasts, the data could be encoded in the third channel for transmission to the decoder/transmitter 22, which would then decode the data from the third channel and transmit it to the receiver/actuator 24. If this alternative is used, it will be apparent that the data need not be encoded in the high end of the audio frequency spectrum, inasmuch as the third channel will not be broadcast to the viewer, but only used for transmitting the encoded data. A still further modification is to encode the data in a digital format for transmission to the decoder/transmitter 22. This alternative is particularly attractive where a large amount of data is to be transmitted, since it will be apparent that the available bandwidth at the high end of the audio range can only accommodate so much data if each data item is encoded as a different tone.

It will further be apparent that while a radio transmitter is selected for communication between the decoder/transmitter 22 and the receiver/actuator 24, this is not absolutely necessary, and other types of signals may be used for transmitting the data received by the decoder/transmitter 22 to the receiver/actuator 24. For example, an infrared signal could be employed.

While we have herein shown and described a preferred embodiment of this system in accordance with the present invention and suggested certain modifications thereto, it will be apparent from this description that still further changes and modifications may be made therein without departing from the spirit and scope of this invention. Accordingly, the above description should be construed as illustrative, and not in a limiting sense, the scope of the invention being defined by the following claims.

We claim:

1. A system for enhancing the perception of an audio and/or visual presentation through stimulation of one or more persons experiencing said audio and/or visual presentation, said system comprising:

means for generating data representing one or more events occurring during said audio and/or visual presentation;

means for encoding said data in a first signal in a form suitable for transmission;

means for transmitting said encoded signal in real time correspondence with said audio and/or visual presentation;

means for receiving said transmitted encoded signal and for producing a second signal modulated by said data; and means responsive to said second signal and disposed in proximity to said one or more persons for stimulation of said one or more persons in response to each of said events represented by said data, said stimulation of said one or more persons occurring in real time correspondence with the occurrence of said events in said audio and/or visual presentation as experienced by said one or more persons for stimulation of said one or more persons as said events occur in said audio and/or visual presentation.

2. The system according to claim 1, wherein said presentation comprises an audio presentation and means for generating an audio signal representing said audio presentation; further comprising means for attenuating the portion of said audio signal in the high end of the audio frequency range; wherein said means for encoding said data in a first signal comprises means for encoding said data in said high end of the audio frequency range and further comprises means for combining said attenuated audio signal and said first signal to form a combined audio signal; and wherein said means for transmitting said encoded signal comprises means for transmitting an audio signal comprising said combined audio signal.

3. The system according to claim 2, wherein said means for receiving said transmitted encoded signal comprises means for separating said combined audio signal into a first component comprising the portion of the audio frequency range below said high end thereof and a second component comprising the portion of said audio frequency range in said high end thereof.

4. The system according to claim 2, wherein said presentation further comprises a visual presentation and means for generating a video signal representing said visual presentation; and means for simultaneously transmitting said audio signal and said video signal.

5. The system according to claim 3, wherein said presentation further comprises a visual presentation and means for generating a video signal representing said video presentation, and means for simultaneously transmitting said audio signal and said video signal.

6. The system according to claim 1, wherein said presentation comprises a visual presentation and means for generating a video signal representing said visual presentation; wherein said means for encoding said data in a first signal comprises means for encoding said data in said video signal; and wherein said means for transmitting said encoded data comprises means for transmitting said video signal.

7. The system according to claim 6, wherein said means for receiving said transmitted encoded signal comprises means for separating said video signal into a portion comprising said visual representation and another portion comprising said encoded data.

8. The system according to claim 1, wherein said presentation comprises an audio presentation and means for generating an audio signal having two channels with one channel representing said audio presentation; wherein said means for encoding said data in a first signal comprises means for encoding said data in the other channel; and wherein said means for transmitting said encoded signal comprises means for transmitting said two channel audio signal.

9. The system according to claim 6, wherein said presentation further comprises an audio presentation and means for generating an audio signal representing said audio presentation, and means for simultaneously transmitting said audio signal and said video signal.

10. The system according to claim 8, wherein said presentation further comprises a visual presentation and means for generating a video signal representing said visual presentation; and means for simultaneously transmitting said audio signal and said video signal.

11. The system according to claim 1, wherein said means for generating said data representing said one or more events comprises means for manually generating said data during observation of said presentation.

12. The system according to claim 1, wherein said means for generating said data representing said one or more events comprises means responsive to an audio portion of said presentation for automatically generating said data as said events occur during said presentation.

13. The system according to claim 2, wherein said means for encoding said data in a first signal comprises means for generating one or more specific tone frequencies, each specific tone frequency representing a specific type of data.

14. The system according to claim 8, wherein said means for encoding said data in a first signal comprises means for generating one or more specific tone frequencies, each specific tone frequency representing a specific type of data.

15. The system according to claim 1, wherein said means for transmitting said encoded signal comprises means for transmitting an electromagnetic signal through the atmosphere, and wherein said means for receiving said transmitted encoded signal comprises means for detecting said electromagnetic signal.

16. The system according to claim 1, wherein said means for receiving said transmitted encoded signal and for producing a second signal modulated by said data further comprises means for transmitting said modulated signal to said means for stimulation of said one or more persons.

17. The system according to claim 16, wherein said means for transmitting said modulated signal to said means for stimulation of said one or more persons comprises means for transmitting an electromagnetic signal through the atmosphere, and wherein said means for stimulation of said one or more persons further comprises means for detecting said electromagnetic signal.

18. The system according to claim 1, wherein said means for stimulation of said one or more persons comprises means for producing a plurality of different types of stimulation, each different type of stimulation corresponding to a specific type of data in said second signal.

19. The system according to claim 1, wherein said means responsive to said second signal for stimulation of said viewers comprises an actuator responsive to said second signal.

20. The system according to claim 19, further comprising means responsive to said actuator for visual stimulation of said viewers.

21. The system according to claim 19, further comprising means responsive to said actuator for audible stimulation of said viewers.

22. The system according to claim 19, further comprising means responsive to said actuator for tactile stimulation of said viewers.

23. The system according to claim 19, further comprising means responsive to said actuator for olfactory stimulation of said viewers.

24. The system according to claim 22, wherein said tactile stimulation means comprises means for generating movement of a member for contacting a viewer in response to said data in said second signal representing said events.

25. The system according to claim 1, wherein said presentation comprises an audiovisual presentation of a boxing match.

26. The system according to claim 25, wherein said means for generating data representing one or more events occuring during said boxing match comprises means for generating data representing punches landed by the hands of both boxers; and wherein said means responsive to said second signal for stimulation of said one or more persons comprises means for impacting the hands of said one or more persons in real time correspondence with said punches landed by said boxers for tactile stimulation of said one or more persons.

27. The system according to claim 26, wherein said means for impacting the hands of said one or more persons further comprises switch means for enabling said one or more persons to be selectively impacted in response to punches landed by one or the other of said boxers.

28. The system according to claim 1, wherein said presentation comprises music, and wherein said means for generating data representing said one or more events occurring during said music comprises means for generating data representing different audio frequencies in said music.

29. The system according to claim 3, and further comprising means responsive to said first component of said combined audio signal for producing sound.

30. The system according to claim 29, further comprising means responsive to said video signal for producing a visible display of said video presentation.

31. The system according to claim 6, further comprising means responsive to said video signal for producing a visible display of said video presentation.

32. The system according to claim 9, further comprising means responsive to said audio signal for producing sound.

33. The system according to claim 8, further comprising means responsive to said one channel for producing sound.

34. The system according to claim 10, further comprising means responsive to said video signal for producing a visible display of said video presentation.

35. The system according to claim 2, wherein said means for combining said attenuated audio signal and said first signal comprises means for recording said combined signal in a medium, and wherein said means for transmitting said combined signal comprises means for transmitting said recorded signal.

36. The system according to claim 4, wherein said means for combining said attenuated audio signal and said first signal comprises means for recording said combined signal in a medium with said video signal, and wherein said means for transmitting said combined signal comprises means for transmitting said recorded signal.

37. The system according to claim 6, wherein said means for transmitting said video signal comprises means for recording said video signal in a medium and means for transmitting said recorded signal.

38. The system according to claim 9, wherein said means for transmitting said audio and video signals comprises recording said audio and video signals in a medium and means for transmitting said recorded signal.

39. The system according to claim 8, wherein said means for transmitting said audio signal comprises means for recording said audio signal in a medium and means for transmitting said recorded signal.

40. The system according to claim 10, wherein said means for transmitting said audio and video signals comprises recording said audio and video signals in a medium and means for transmitting said recorded signal.

41. The system according to claim 5, wherein said means for receiving said transmitted signal comprises means for separating said transmitted signal into its audio and video components.

42. The system according to claim 41, wherein said means for separating said transmitted signal into its audio and video components comprises a VCR.

43. The system according to claim 9, wherein said means for receiving said transmitted signal comprises means for separating said transmitted signal into its audio and video components.

44. The system according to claim 43, wherein said means for separating said transmitted signal into its audio and video components comprises a VCR.

45. The system according to claim 10, wherein said means for receiving said transmitted signal comprises means for separating said transmitted signal into its audio and video components.

46. The system according to claim 45, wherein said means for separating said transmitted signal into its audio and video components comprises a VCR.

47. A system for enhancing the perception of an audio and/or visual presentation through stimulation of one or more persons experiencing said audio and/or visual presentation comprising:
  a medium in which said audio and/or visual presentation is recorded in a form suitable for playback on a conventional playback device;
  data encoded in said medium representing one or more events occurring during said audio and/or visual presentation;
  means for transmitting a first signal representing said data to a location remote from said conventional playback device as said audio and/or visual presentation is viewed;
  means remote from said conventional playback device for receiving said first signal data and for producing a second signal modulated by said data; and
  means responsive to said second signal and disposed in the vicinity of said one or more persons for stimulating said one or more persons in response to each of said events represented by said data, said stimulation of said one or more persons occurring in real time correspondence with the occurrence of said events in said audio and/or visual presentation as experienced by said one or more persons for stimulation of said one or more persons as said events occur in said audio and/or visual presentation.

48. The system according to claim 47, wherein said presentation comprises an audio presentation, and wherein said data is encoded in the high end of the audio frequency range and the audio presentation is in the portion of the audio frequency range below said high end, and further comprising means for separating the information in the medium into a first component comprising the high end of the audio frequency range and a second component comprising the portion of the audio frequency range below said high end.

49. The system according to claim 48, wherein said presentation further comprises a visual presentation.

50. The system according to claim 47, wherein said presentation comprises a visual presentation and wherein said data is encoded with said visual presentation as recorded in said medium, and further comprising means for separating the visual presentation as recorded in said medium into a first component comprising said visual presentation and a second component comprising said encoded data.

51. The system according to claim 47, wherein said presentation comprises an audio presentation recorded in a first audio channel of said medium, and wherein said data is encoded in a second audio channel of said medium.

52. The system according to claim 50, wherein said presentation further comprises an audio presentation.

53. The system according to claim 51, wherein said presentation further comprises a visual presentation.

54. The system according to claim 48, wherein said data comprises one or more specific tone frequencies encoded in said high end of said audio frequency range, each specific tone frequency representing a specific type of data.

55. The system according to claim 51, wherein said data comprises one or more specific tone frequencies, each specific tone frequency representing a specific type of data.

56. The system according to claim 47, wherein said means for transmitting said first signal comprises means for transmitting an electromagnetic signal through the atmosphere, and wherein said means for stimulation of said one or more persons further comprises means for detecting said electromagnetic signal.

57. The system according to claim 47, wherein said means for stimulation of said one or more persons comprises means for producing a plurality of different types of stimulation, each different type of stimulation corresponding to a specific type of data in said second signal.

58. The system according to claim 47, wherein said means responsive to said second signal for stimulation of said viewers comprises an actuator responsive to said second signal.

59. The system according to claim 58, further comprising means responsive to said actuator for visual stimulation of said viewers.

60. The system according to claim 58, further comprising means responsive to said actuator for audible stimulation of said viewers.

61. The system according to claim 58, further comprising means responsive to said actuator for tactile stimulation of said viewers.

62. The system according to claim 58, further comprising means responsive to said actuator for olfactory stimulation of said viewers.

63. The system according to claim 61, wherein said tactile stimulation means comprises means for generating movement of a member for contacting a viewer in response to said data in said second signal representing said events.

64. The system according to claim 47, wherein said presentation comprises an audiovisual presentation of a boxing match.

65. The system according to claim 64, wherein said events comprise punches landed by the boxers in said boxing match, and wherein said means responsive to said second signal for stimulation of said one or more persons comprises means for impacting the hands of said one or more persons in real time correspondence with said punches landed by said boxers for tactile stimulation of said one or more persons.

66. The system according to claim 65, wherein said means for impacting the hands of said one or more persons further comprises switch means for enabling said one or more persons to be selectively impacted in response to punches landed by one or the other of said boxers.

67. The system according to claim 47, wherein said presentation comprises music and wherein said events comprise specific audio frequencies in said music.

68. In a medium of the type in which an audio and/or visual presentation is encoded in a form suitable for playback on a playback device, the improvement comprising data other than said audio and/or visual presentation encoded in said medium, said data representing one or more events occurring during said audio and/or visual presentation, said data being encoded in said medium in a form suitable for transmission in a first signal to a location remote from the playback device where means responsive to said data effects stimulation of one or more persons in response to the events represented by said data with said stimulation of said one or more persons occurring in real time correspondence with the occurrence of said events in said audio and/or visual presentation as experienced by said one or more persons for stimulation of said one or more persons as said events occur in said audio and/or visual presentation.

69. A medium according to claim 68, wherein said presentation comprises an audio presentation, and wherein said data is encoded in the high end of the audio frequency range and the audio presentation is in the portion of the audio frequency range below said high end, and further comprising means for separating the information in the medium into a first component comprising the high end of the audio frequency range and a second component comprising the portion of the audio frequency range below said high end.

70. A medium according to claim 69, wherein said presentation further comprises a visual presentation.

71. A medium according to claim 68, wherein said presentation comprises a visual presentation and wherein said data is encoded with said visual presentation as recorded in said medium, and further comprising means for separating said visual presentation as recorded in said medium into a first component comprising said visual presentation and a second component comprising said encoded data.

72. A medium according to claim 68, wherein said presentation comprises an audio presentation recorded in a first audio channel of said medium, and wherein said data is encoded in a second audio channel of said medium.

73. A medium according to claim 71, wherein said presentation further comprises an audio presentation.

74. A medium according to claim 72, wherein said presentation further comprises a visual presentation.

75. A medium according to claim 69, wherein said data comprises one or more specific tone frequencies encoded in said high end of said audio frequency range, each specific tone frequency representing a specific type of data.

76. A medium according to claim 72, wherein said data comprises one or more specific tone frequencies, each specific tone frequency representing a specific type of data.

77. A medium according to claim 68, wherein said presentation comprises an audiovisual presentation of a boxing match.

78. A medium according to claim 77, wherein said events comprise punches landed by the boxers in said boxing match.

79. A medium according to claim 68, wherein said presentation comprises music and wherein said events comprise specific audio frequencies in said music.

80. A medium according to claim 68, wherein said medium comprises a videocassette or video cartridge.

81. A medium according to claim 68, wherein said medium comprises an audio cassette, record or compact disc.

* * * * *